United States Patent
Kim et al.

(10) Patent No.: US 11,990,767 B2
(45) Date of Patent: *May 21, 2024

(54) NEAR FIELD COMMUNICATION INTEGRATED CIRCUIT AND WIRELESS COMMUNICATION DEVICE INCLUDING THE SAME

(71) Applicant: Samsung Electronics Co., Ltd., Suwon-si (KR)

(72) Inventors: In-hyuk Kim, Hanam-si (KR); Seok-hyun Kim, Hwaseong-si (KR); Young-seok Kim, Gwangju-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 367 days.

This patent is subject to a terminal disclaimer.

(21) Appl. No.: 17/352,684

(22) Filed: Jun. 21, 2021

(65) Prior Publication Data
US 2021/0313839 A1 Oct. 7, 2021

Related U.S. Application Data

(63) Continuation of application No. 16/258,958, filed on Jan. 28, 2019, now Pat. No. 11,043,849.

(30) Foreign Application Priority Data

Mar. 27, 2018 (KR) .......................... 10-2018-0035365

(51) Int. Cl.
*H02J 7/00* (2006.01)
*G06F 1/26* (2006.01)
(Continued)

(52) U.S. Cl.
CPC .............. *H02J 50/12* (2016.02); *G06F 1/263* (2013.01); *G06F 1/325* (2013.01); *H02J 7/0068* (2013.01);
(Continued)

(58) Field of Classification Search
None
See application file for complete search history.

(56) References Cited

U.S. PATENT DOCUMENTS 7,376,847 B2   5/2008   Chen et al.
7,831,852 B2  11/2010   Yamazaki et al.
(Continued)

FOREIGN PATENT DOCUMENTS

KR   10-2013-0137479 A   12/2013
KR   10-2017-0050055 A    5/2017
KR   10-2017-0088204 A    8/2017

OTHER PUBLICATIONS

Korean Office Action for KR Patent Application No. 10-2018-0035365 dated Dec. 9, 2022.
(Continued)

*Primary Examiner* — Arun C Williams
(74) *Attorney, Agent, or Firm* — Harness, Dickey & Pierce, P.L.C.

(57) ABSTRACT

A wireless communication device includes a battery, a power management integrated circuit (PMIC), a near field communication (NFC) integrated circuit connected to the battery and to the PMIC, and an internal device connected to the NFC integrated circuit and configured to support an NFC operation, wherein the NFC integrated circuit includes a power supply path control circuit configured to cut off a first power supply path from the PMIC to the internal device when the NFC integrated circuit is in an on-state or an operating state and to form a second power supply path from the battery to the internal device to supply power to the internal device based on existence or non-existence of a first supply voltage provided from the PMIC.

18 Claims, 22 Drawing Sheets

(51) Int. Cl.
*G06F 1/3234* (2019.01)
*H02J 50/12* (2016.01)
*H02J 50/80* (2016.01)
*H04B 5/00* (2006.01)
*H04B 5/72* (2024.01)
*H04B 5/79* (2024.01)
*G06F 1/28* (2006.01)
*H04W 4/80* (2018.01)
*H04W 52/02* (2009.01)

(52) U.S. Cl.
CPC ............... *H02J 50/80* (2016.02); *H04B 5/00* (2013.01); *H04B 5/72* (2024.01); *H04B 5/79* (2024.01); *G06F 1/28* (2013.01); *H04W 4/80* (2018.02); *H04W 52/0251* (2013.01)

(56) References Cited

U.S. PATENT DOCUMENTS

| | | | |
|---|---|---|---|
| 7,912,441 | B2 | 3/2011 | Von Bosch |
| 8,565,675 | B2 | 10/2013 | Bangs et al. |
| 9,402,278 | B2 | 7/2016 | Adams et al. |
| 9,520,739 | B2 * | 12/2016 | Endo ............... H02J 50/12 |
| 9,729,205 | B2 | 8/2017 | Pietri et al. |
| 10,404,695 | B2 | 9/2019 | Jang |
| 10,432,009 | B2 | 10/2019 | Pan et al. |
| 2008/0188178 | A1 * | 8/2008 | Maugars ............... H04W 88/06 455/41.1 |
| 2008/0272889 | A1 | 11/2008 | Symons |
| 2012/0083205 | A1 | 4/2012 | Marcu et al. |
| 2013/0217325 | A1 | 8/2013 | Ingels |
| 2013/0332756 | A1 | 12/2013 | Kim et al. |
| 2014/0141844 | A1 | 5/2014 | Golla et al. |
| 2014/0292267 | A1 * | 10/2014 | Ahn ....................... H02J 50/20 320/108 |
| 2014/0375139 | A1 | 12/2014 | Tsukamoto |
| 2015/0064513 | A1 | 3/2015 | Thoelmann et al. |
| 2016/0087688 | A1 | 3/2016 | Fukaya |
| 2017/0181087 | A1 | 6/2017 | Kato et al. |
| 2017/0212574 | A1 | 7/2017 | Kang et al. |
| 2017/0294798 | A1 | 10/2017 | Yuk et al. |
| 2018/0175676 | A1 | 6/2018 | Ikefuji et al. |

OTHER PUBLICATIONS

Extended European Search Report dated Jul. 22, 2019 for EP Application No. 19165197.5.
Office Action dated Nov. 10, 2023 in Chinese Application No. 201910141691.X.

* cited by examiner

NEAR FIELD COMMUNICATION INTEGRATED CIRCUIT AND WIRELESS COMMUNICATION DEVICE INCLUDING THE SAME

CROSS-REFERENCE TO RELATED APPLICATION

This is a continuation application of U.S. application Ser. No. 16/258,958, filed on Jan. 28, 2019, which claims the benefit of Korean Patent Application No. 10-2018-0035365, filed on Mar. 27, 2018, in the Korean Intellectual Property Office, the disclosure of which is incorporated herein in its entirety by reference.

BACKGROUND

Example embodiments of the inventive concepts relate to a near field communication (NFC) integrated circuit. For example, at least some example embodiments relate to an NFC integrated circuit for stably supplying power to a device communicating with the NFC integrated circuit and/or a wireless communication device including the NFC integrated circuit.

A wireless communication device may include an NFC integrated circuit and at least one internal device (e.g., a secure element) supporting NFC to perform NFC with an external device. The internal device may communicate with the NFC integrated circuit so as to transmit and receive data for NFC with the external device.

To facilitate communication between the internal device and the NFC integrated circuit using NFC, power may be immediately supplied to the internal device through the NFC integrated circuit so that the internal device may communicate with the NFC integrated circuit.

However, conventionally, to facilitate communication between the internal device and a processor (e.g., an application processor) of the wireless communication device other than the NFC integrated circuit, power may be supplied to the internal device under the control of the processor. Accordingly, when the NFC integrated circuit and the processor need to simultaneously or sequentially communicate with the internal device, powers supplied to the internal device may collide with each other or constant power may not be supplied to the internal device. As a result, reliable operation of the internal device may not be secured.

SUMMARY

Example embodiments of the inventive concepts provide a near field communication (NFC) integrated circuit for controlling a power supply path to an internal device to secure the reliable operation of the internal device and/or a wireless communication device including the NFC integrated circuit.

According to an example embodiment of the inventive concepts, there is provided a wireless communication device including an internal device configured to support a near field communication (NFC) operation; and an NFC integrated circuit connected to a battery and to a power management integrated circuit (PMIC), the NFC integrated circuit including a power supply path control circuit configured to, open a first power supply path from the PMIC to the internal device when the NFC integrated circuit is in a first state, and form a second power supply path from the battery to the internal device based whether a first supply voltage is provided from the PMIC.

According to another example embodiment of the inventive concepts, there is provided an NFC integrated circuit configured to perform an NFC operation, the NFC integrated circuit comprising: a first terminal configured to receive a first supply voltage destined for an internal device connected to the NFC integrated circuit; a second terminal configured to receive a second supply voltage used for the NFC operation; and a power supply path control circuit configured to, open a first power supply path between the first terminal and the internal device when the NFC integrated circuit is in a first state, and form a second power supply path between the second terminal and the internal device based on whether the NFC integrated circuit receives the first supply voltage.

According to still another example embodiment of the inventive concept, there is provided a wireless communication device including a battery; a power management integrated circuit (PMIC) configured to generate a supply voltage having a first waveform; an internal device configured to support wireless communication; and a near field communication (NFC) integrated circuit connected to the internal device and the PMIC, the NFC integrated circuit including a regulator connected to the battery and configured to generate a supply voltage having a second waveform, the NFC integrated circuit configured to, provide the supply voltage having the second waveform to the internal device when the NFC integrated circuit is in a first state, and provide the supply voltage having the first waveform to the internal device when the NFC integrated circuit is in second state, the second state being a different operating state from the first state.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Figure 1:
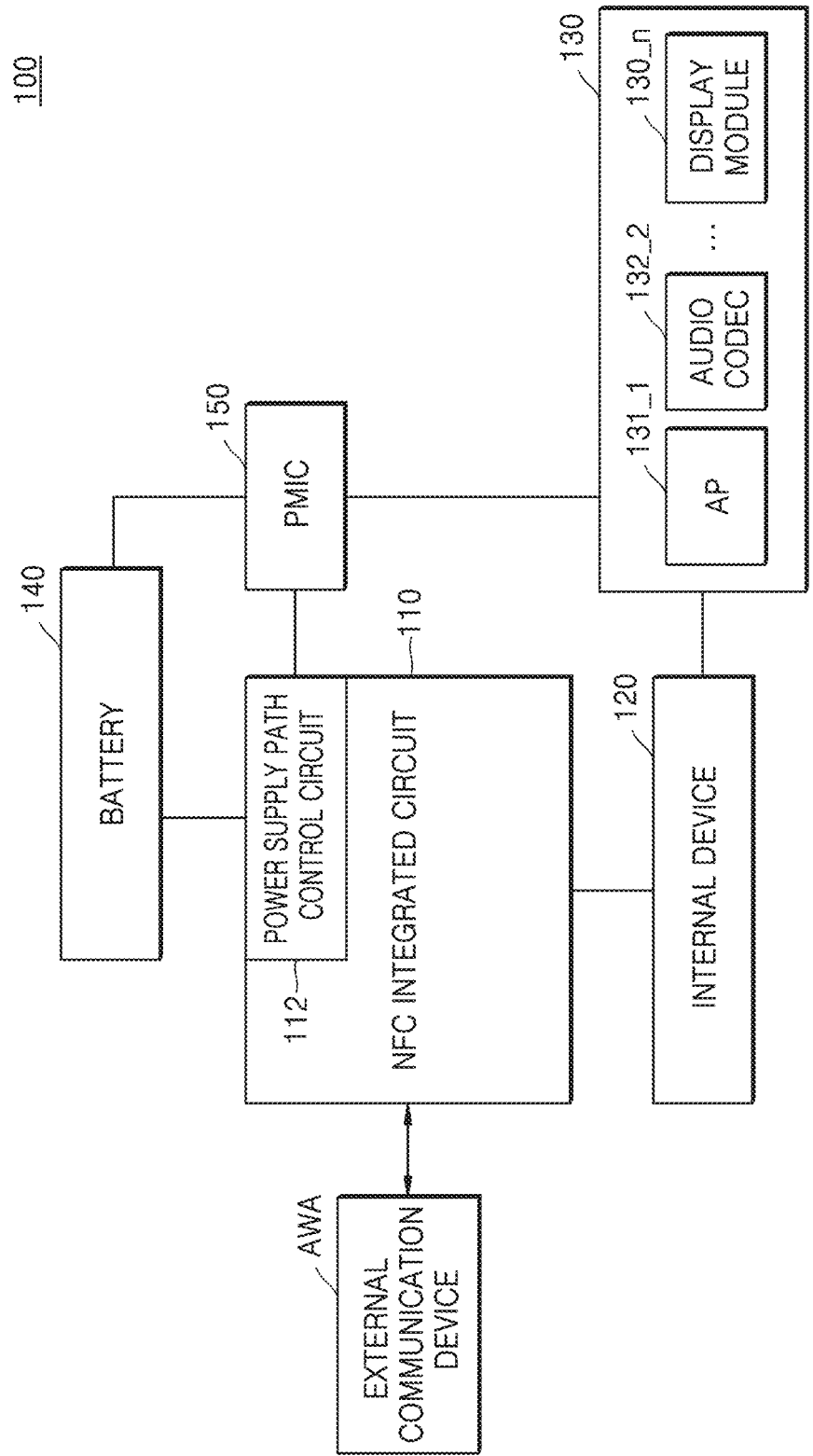
FIG. 1 is a block diagram of a wireless communication device according to an example embodiment of the inventive concepts.

FIG. 1 is a block diagram of a wireless communication device 100 according to an example embodiment of the inventive concepts. Although a mobile communication terminal is described as an example with reference to FIG. 1, the inventive concepts are not limited thereto, and the wireless communication device 100 may include a near field communication (NFC) device. Furthermore, it will be understood that the concept of the wireless communication device 100 covers any electronic device which wirelessly communicates with an external communication device.

Referring to FIG. 1, the wireless communication device 100 may include an NFC integrated circuit 110, an internal device 120, service supporting devices 130, a battery 140, and a power management integrated circuit (PMIC) 150.

The wireless communication device 100 may communicate with an external communication device AWA using an NFC protocol.

The NFC integrated circuit 110 may be connected to the battery 140 and perform NFC using power supplied from the battery 140.

The internal device 120 is provided to support an NFC operation. The internal device 120 may manage data for the NFC operation. Hereinafter, the internal device 120 is described as including a secure element, but example embodiments of the inventive concepts are not limited thereto. It will be understood that the internal device 120 includes a device supporting various communication operations apart from the NFC operation.

The service supporting devices 130 provide various services for a user of the wireless communication device 100. The service supporting devices 130 may include an application processor (AP) 131_1, an audio codec 132_2, and a display module 130_n. The service supporting devices 130 may communicate with the internal device 120 to support services. Although descriptions below will be focused on the AP 131_1, the AP 131_1 is just an example, and it is apparent that example embodiments of the inventive concepts may also be applied to the operations between the internal device 120 and any one of the service supporting devices 130.

The AP 131_1 may communicate with the internal device 120 to exchange security data to provide services for a user. For example, the AP 131_1 may communicate with the internal device 120 based on a serial peripheral interface (SPI). In an example of communication between the AP 131_1 and the internal device 120, the AP 131_1 may acquire and provide a user's fingerprint information to the internal device 120 so as to provide a service, for which security is a prerequisite, for the user. The internal device 120 may manage the fingerprint information and may provide the fingerprint information stored therein to the AP 131_1 in response to a fingerprint request from the AP 131_1. The internal device 120 may be supplied with power, for communication with the AP 131_1, through the NFC integrated circuit 110. In an example embodiment, the AP 131_1 may control the PMIC 150 such that the power is supplied to the internal device 120. The PMIC 150 may apply a supply voltage to the NFC integrated circuit 110 in response to a request from the AP 131_1, and the NFC integrated circuit 110 may bypass the supply voltage to the internal device 120. However, it is just one embodiment and the inventive concepts are not limited thereto. The NFC integrated circuit 110 may regulate the supply voltage received from the PMIC 150 before providing the supply voltage to the internal device 120. Hereinafter, a path of power supplied from the PMIC 150 to the internal device 120 may be defined as a first power supply path.

The NFC integrated circuit 110 may communicate with the internal device 120 to exchange security data for an NFC operation. For example, the NFC integrated circuit 110 may communicate with the internal device 120 based on a single wired protocol (SWP). The NFC integrated circuit 110 may provide new security data to the internal device 120, and the internal device 120 may manage the new security data. When the internal device 120 receives a security data request from the NFC integrated circuit 110, the internal device 120 may provide security data stored therein to the NFC integrated circuit 110. The internal device 120 may be supplied with power, to communicate with the NFC integrated circuit 110, through the NFC integrated circuit 110. In an example embodiment, the NFC integrated circuit 110 may regulate a supply voltage received from the battery 140 to an operating voltage of the internal device 120 and provide the regulated supply voltage to the internal device 120. Hereinafter, a path of power supplied from the battery 140 to the internal device 120 may be defined as a second power supply path.

The NFC integrated circuit 110 may include a power supply path control circuit 112. The power supply path control circuit 112 may control a power supply path through which power is supplied to the internal device 120. In an example embodiment, the power supply path control circuit 112 may control a power supply path so as to reduce (or, alternatively, minimize) collision or mutual influence between a supply voltage provided from the PMIC 150 to the internal device 120 and a supply voltage provided from the battery 140 to the internal device 120.

In an example embodiment, the power supply path control circuit 112 may efficiently control a power supply path based on a state of the NFC integrated circuit 110. For example, when the NFC integrated circuit 110 is in an on-state (or an operating state), the power supply path control circuit 112 may cut off the first power supply path and may detect a supply voltage provided from the PMIC 150 to the NFC integrated circuit 110 and form the second power supply path based on the detection result. Thereafter, the power supply path control circuit 112 may form the first power supply path and cut off the second power supply path before the NFC integrated circuit 110 is changed from the on-state (or the operating state) into an off-state (or an idle state). Accordingly, when the NFC integrated circuit 110 is in the off-state (or the idle state), the first power supply path may be formed while the second power supply path may be cut off. At this time, the supply voltage received from the PMIC 150 may be bypassed to the internal device 120.

In an example embodiment, the NFC integrated circuit 110 may be changed from the off-state into the on-state and perform an NFC operation. When the NFC operation has not been performed for a desired (or, alternatively, a predetermined) time period, the NFC integrated circuit 110 may be changed from the on-state into the off-state. In another example embodiment, the NFC integrated circuit 110 may be changed from the idle state into the operating state and perform the NFC operation. When the NFC operation has not been performed for a desired (or, alternatively, a predetermined) time period, the NFC integrated circuit 110 may be changed from the operating state into the idle state. In the idle state, the NFC integrated circuit 110 may be on standby, consuming relatively less (or, alternatively, minimum) power, until receiving an NFC request or transmitting the NFC request to an external communication device. In the operating state, the NFC integrated circuit 110 may perform the NFC operation in response to the NFC request or may transmit the NFC request to the external communication device and perform the NFC operation according to a response from the external communication device.

The power supply path control circuit 112 may immediately control a supply path of power to the internal device 120 according to the state of the NFC integrated circuit 110, thereby reducing (or, alternatively, preventing) collision or a bad influence between powers received through multiple power supply paths. As a result, reliable operation of the internal device 120 may be secured.

Figure 2A:
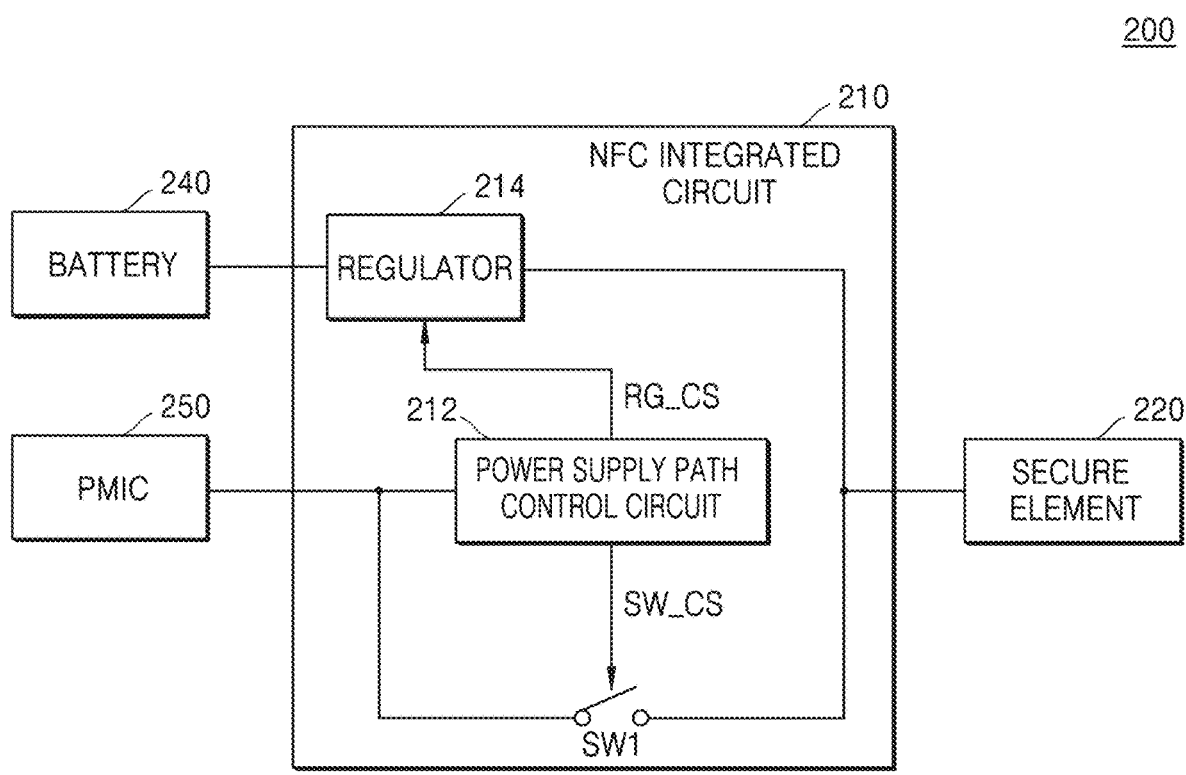
FIGS. 2A through 2C are block diagrams of a wireless communication device including a near field communication (NFC) integrated circuit, according to an example embodiment of the inventive concepts.
Figure 2B:
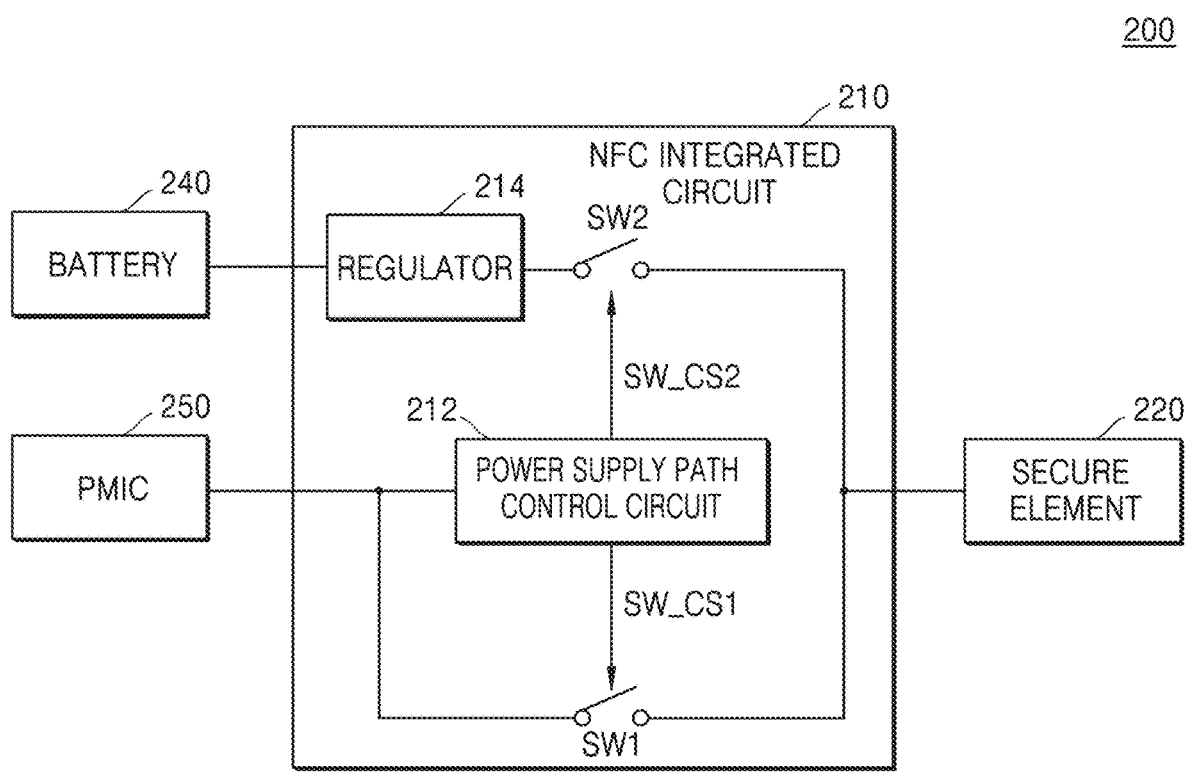
Figure 2C:
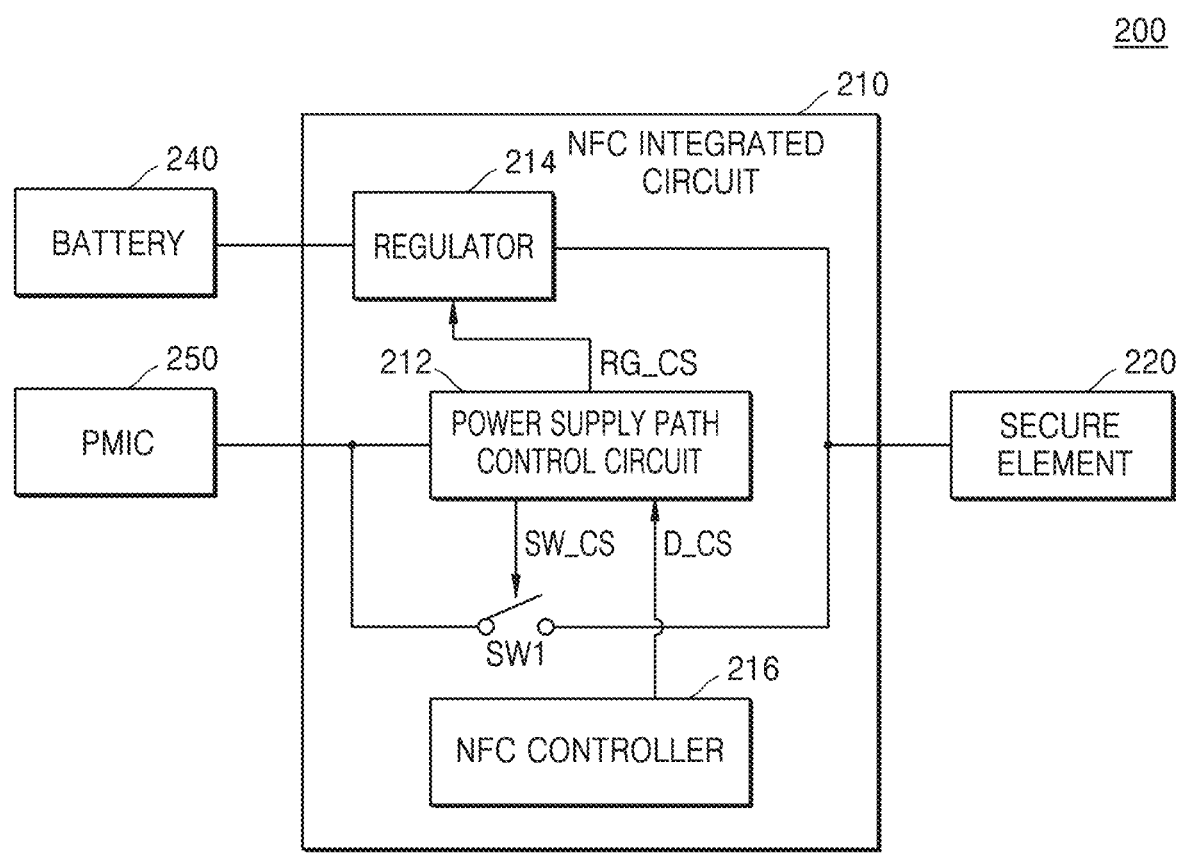

FIGS. 2A through 2C are block diagrams of a wireless communication device 200 including an NFC integrated circuit 210, according to an example embodiment of the inventive concepts.

Referring to FIG. 2A, the wireless communication device 200 may include the NFC integrated circuit 210, a secure element 220, a battery 240, and a PMIC 250.

The NFC integrated circuit 210 may include a power supply path control circuit 212, a regulator 214, and a first switch element SW1. The regulator 214 may be implemented as a low dropout (LDO) circuit. The regulator 214 may be connected to the battery 240 and may regulate a second supply voltage provided from the battery 240 to an operating voltage of the secure element 220.

In an example embodiment, the power supply path control circuit 212 may control a first power supply path through which a first supply voltage from the PMIC 250 is applied to the secure element 220 and a second power supply path through which the second supply voltage from the battery 240 is applied to the secure element 220. The second power supply path may include a path through which the second supply voltage regulated by the regulator 214 is provided from the regulator 214 to the secure element 220.

The power supply path control circuit 212 may provide a switching control signal SW_CS to the first switch element SW1 to control the formation or cutoff of the first power supply path. For example, the power supply path control circuit 212 may provide a turn-off control signal to the first switch element SW1 to cut off the first power supply path and provide a turn-on control signal to the first switch element SW1 to form the first power supply path. The power supply path control circuit 212 may provide an enable/disable control signal RG_CS to the regulator 214 to control the formation or cut off of the second power supply path. For example, the power supply path control circuit 212 may provide a disable control signal to the regulator 214 to cut off the second power supply path and provide an enable control signal to the regulator 214 to form the second power supply path.

Referring to FIG. 2B, the NFC integrated circuit 210 may further include a second switch element SW2 as compared to the NFC integrated circuit 210 of FIG. 2A. The configuration of the NFC integrated circuit 210, except for the second switch element SW2, has been described with reference to FIG. 2A above, and thus detailed descriptions thereof will be omitted. The power supply path control circuit 212 may provide a second switching control signal SW_CS2 to the second switch element SW2 to control the formation or cutoff of the second power supply path (i.e., a supply path of a second supply voltage between the battery 240 and the secure element 220). For example, the power supply path control circuit 212 may provide a turn-off control signal to the second switch element SW2 to cut off the second power supply path and provide a turn-on control signal to the second switch element SW2 to form the second power supply path. However, power supply path control methods described with reference to FIGS. 2A and 2B are just example embodiments, and the inventive concepts are not limited thereto. A power supply path may be controlled using various methods. Controlling the first switch element SW1 using a first switching control signal SW_CS1 is the same as or similar to controlling the first switch element SW1 of FIG. 2A, and thus, a detailed description thereof will be omitted.

Referring to FIG. 2C, the NFC integrated circuit 210 may further include an NFC controller 216 as compared to the NFC integrated circuit 210 of FIG. 2A. The configuration of the NFC integrated circuit 210, except for the NFC controller 216, has been described with reference to FIG. 2A above, and thus detailed descriptions thereof will be omitted. The NFC controller 216 may control all operations of the NFC integrated circuit 210. The NFC controller 216 may include a central processing unit (CPU) (not shown), a timer (not shown), etc. The CPU may perform an operation and input/output control for the NFC operation of the NFC integrated circuit 210.

In an example embodiment, the NFC controller 216 may directly control the formation or cutoff of the first power supply path and the second power supply path regardless of the operation of the power supply path control circuit 212. In detail, the NFC controller 216 may provide a direct control signal D_CS to the power supply path control circuit 212, and the power supply path control circuit 212 may generate the switching control signal SW_CS or the enable/disable control signal RG_CS based on the direct control signal D_CS. For example, the NFC controller 216 may test whether power is properly supplied to the secure element 220 through the first power supply path and the second power supply path. For this test, the NFC controller 216 may provide the direct control signal D_CS to the power supply path control circuit 212. In addition, the NFC controller 216 may enable or disable the power supply path control circuit 212 and thus selectively use the function of the power supply path control circuit 212.

The schematic configuration of the NFC integrated circuit 210 has been described with reference to FIGS. 2A through 2C. The operation of the power supply path control circuit 212 will be described with reference to FIGS. 3A through 4C.

FIGS. 3A through 3D are diagrams for explaining the operation of the power supply path control circuit 212. The configuration of the wireless communication device 200 has been described with reference to FIGS. 2A through 2C above, and thus detailed descriptions thereof will be omitted.

Figure 3A:
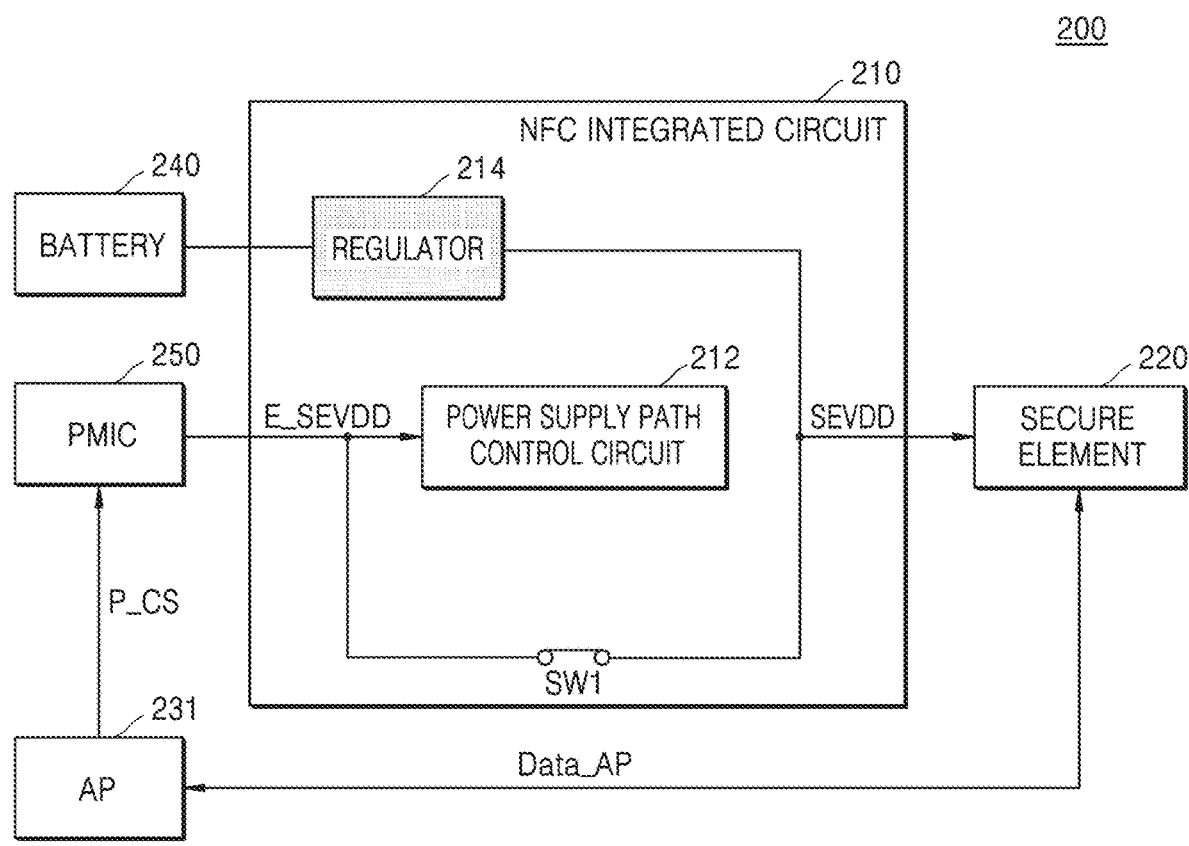
FIGS. 3A through 3D are diagrams for explaining the operation of a power supply path control circuit.

Referring to FIG. 3A, an AP 231 may communicate with the secure element 220 to exchange security data Data_AP with the secure element 220 and may provide a power control signal P_CS to the PMIC 250 to provide power for the communication to the secure element 220. Since the NFC integrated circuit 210 is not performing an NFC operation and, furthermore, is not communicating with the secure element 220, the NFC integrated circuit 210 may be in an off-state (or an idle state) and the regulator 214 may be in a disabled state.

The PMIC 250 may provide the NFC integrated circuit 210 with a first supply voltage E_SEVDD corresponding to an operating voltage of the secure element 220 in response to the power control signal P_CS. The NFC integrated circuit 210 may bypass the first supply voltage E_SEVDD to be provided to the secure element 220 as an input voltage SEVDD. The NFC integrated circuit 210 may turn on the first switch element SW1 in advance to bypass the first supply voltage E_SEVDD. The first switch element SW1 may be referred to as a bypass switch. The secure element 220 may communicate with the AP 231 using power supplied from the PMIC 250.

Figure 3B:
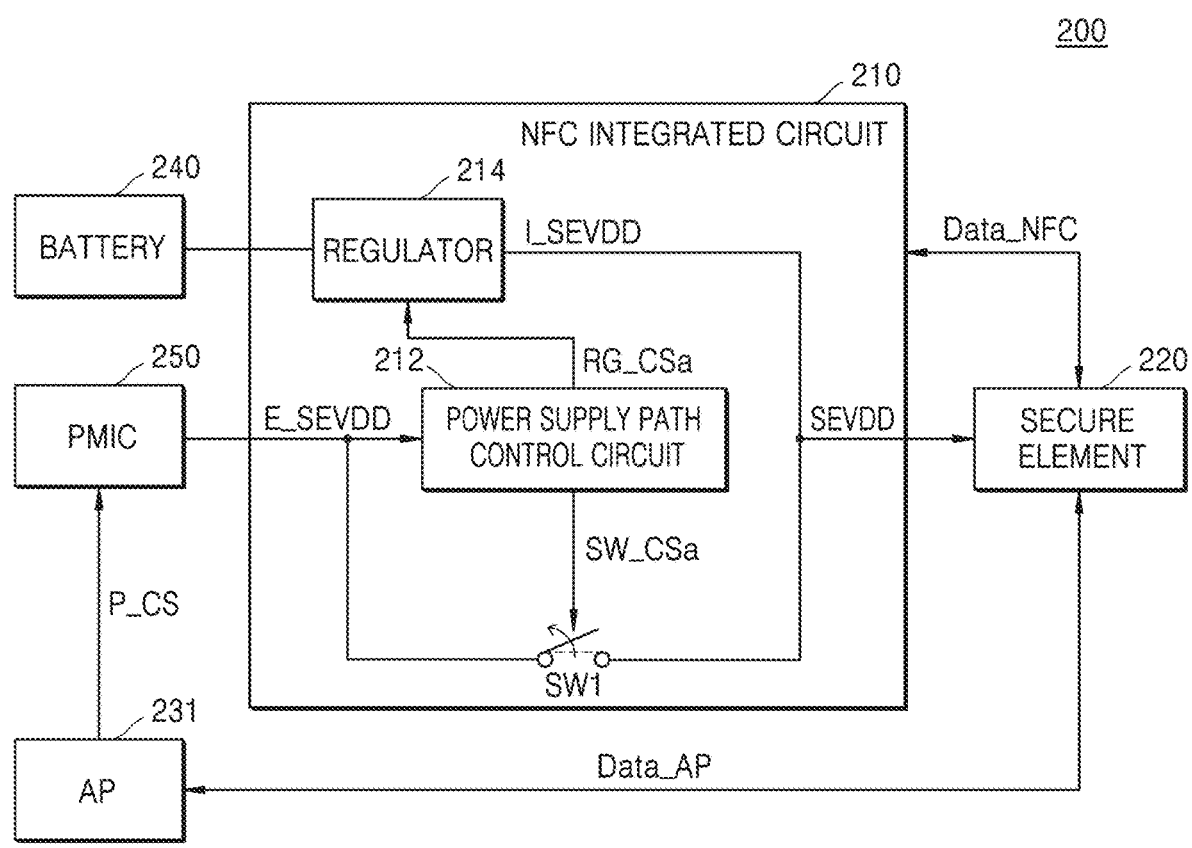

Referring to FIG. 3B, when the NFC integrated circuit 210 is requested to perform an NFC operation or to communicate with the secure element 220, the NFC integrated circuit 210 may be changed from an off-state (or an idle state) into an on-state (or an operating state). The power supply path control circuit 212 may provide a turn-off control signal SW_CSa to the first switch element SW1 to cut off the first power supply path.

In an example embodiment, when the NFC integrated circuit 210 communicates with the secure element 220, the power supply path control circuit 212 may form the second power supply path as a path for supplying power to the secure element 220. When the NFC integrated circuit 210 does not communicate with the secure element 220, the power supply path control circuit 212 may detect existence or non-existence of the first supply voltage E_SEVDD provided from the PMIC 250 and form the second power supply path based on the detection result. Since the NFC integrated circuit 210 currently communicates with the secure element 220, the power supply path control circuit 212 may provide an enable control signal RG_CSa to the regulator 214 to form the second power supply path. Thereafter, when the communication between the NFC integrated circuit 210 and the secure element 220 is completed, the power supply path control circuit 212 may detect existence or non-existence of the first supply voltage E_SEVDD provided from the PMIC 250 and determine whether to maintain the second power supply path, which has been formed, based on the detection result.

The regulator 214 may be connected to the battery 240 and may receive and regulate a second supply voltage. The NFC integrated circuit 210 may provide, as the input voltage SEVDD, a regulated second supply voltage I_SEVDD to the secure element 220 through the second power supply path. The secure element 220 may communicate with the AP 231 to exchange the security data Data_AP and simultaneously communicate with the NFC integrated circuit 210 to exchange security data Data_NFC, using power supplied from the regulator 214. However, this is just an example embodiment, and the inventive concepts are not limited thereto. Communication between the secure element 220 and the AP 231 and communication between the secure element 220 and the NFC integrated circuit 210 may be sequentially performed according to a desired (or, alternatively, a predetermined) order of priority.

Figure 3C:
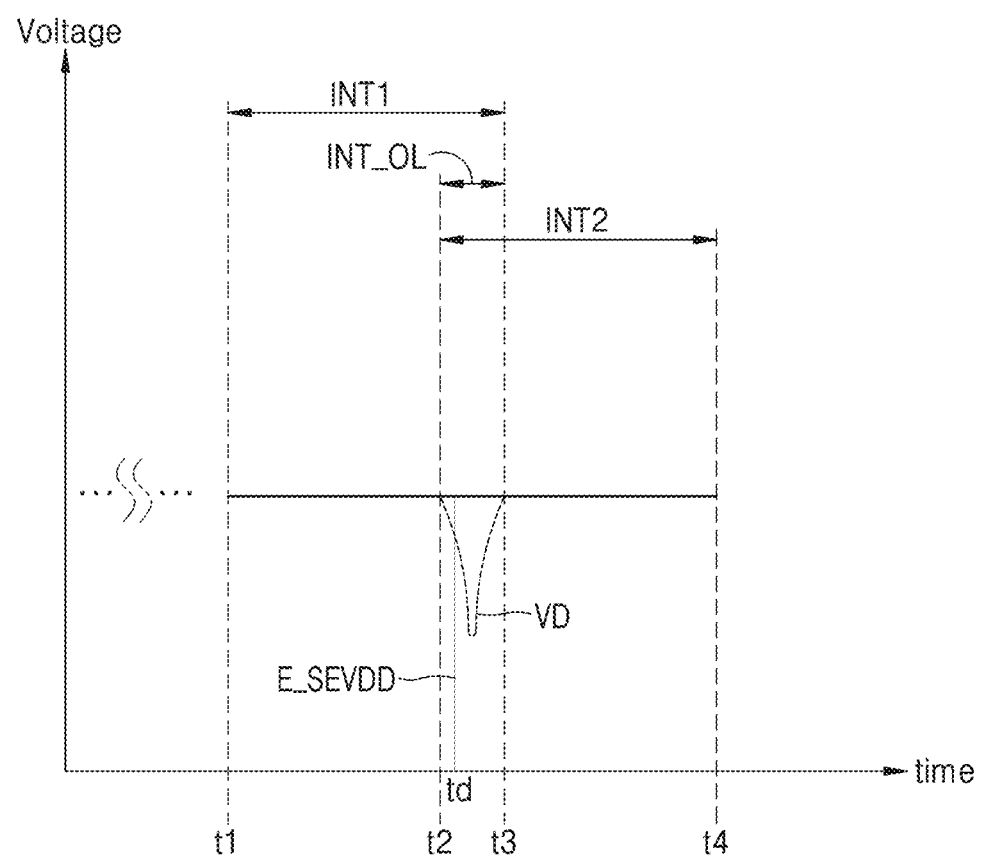

FIG. 3C is a diagram for explaining a method of supplying power to a secure element using a conventional NFC integrated circuit. It is assumed that the conventional NFC integrated circuit does not include a separate hardware or software component, such as a power supply path control circuit according to example embodiments of the inventive concepts, and a power supply path to the secure element may be controlled by an NFC controller. It is also assumed that communication between the secure element and the conventional NFC integrated circuit is requested during communication between the secure element and an AP.

Referring to FIG. 3C, the NFC controller may control the power supply path such that the first supply voltage E_SEVDD from a PMIC is applied to the secure element during a first interval INT1 between a time point t1 and a time point t3. The NFC controller may control the power supply path such that a regulated second supply voltage from a regulator is applied to the secure element during a second interval INT2 between a time point t2 and a time point t4. To stably supply power to the secure element, the NFC controller may control the power supply path such that the first supply voltage E_SEVDD and the regulated second power supply voltage are applied to the secure element during an overlapping interval INT_OL between the first interval INT1 and the second interval INT2. The overlapping interval INT_OL may be defined as a change interval for changing a power source which supplies power to the secure element. In the change interval INT_OL of FIG. 3C, the power source may be changed from the PMIC to the regulator (or a battery). However, when a sudden problem occurs in an AP at a time point "td" during the change interval INT_OL or when communication between the AP and the secure element is completed at the time point "td", the AP may command the PMIC to stop power supply to the secure element, and therefore, the first supply voltage E_SEVDD from the PMIC may not be applied to the conventional NFC integrated circuit at the time point "td". When the first supply voltage E_SEVDD is not applied at the time point "td" during the change interval INT_OL, a supply voltage drop VD may occur in the secure element since power supply paths in the conventional NFC integrated circuit have the configuration of connected circuits. An unstable supply voltage may be unexpectedly applied to the secure element during the change interval INT_OL, and the unstable supply voltage may cause an operational error in the secure element.

Figure 3D:
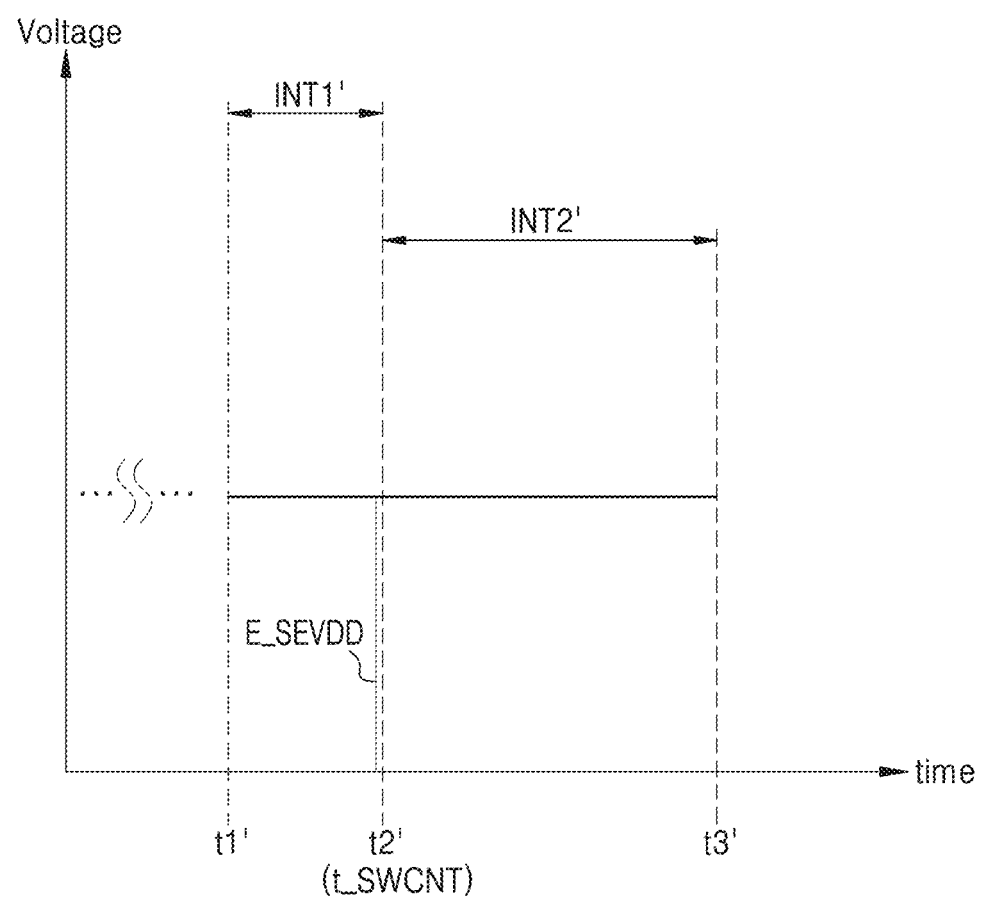

FIG. 3D is a diagram for explaining a method of supplying power to a secure element using an NFC integrated circuit, according to embodiment embodiments of the inventive concepts. FIG. 3D will be described with reference to FIG. 3A or 3B. It is assumed that communication between the secure element 220 and the NFC integrated circuit 210 is requested during communication between the secure element 220 and the AP 231.

Referring to FIG. 3D, the power supply path control circuit 212 may control the first power supply path such that the first supply voltage E_SEVDD from the PMIC 250 is applied to the secure element 220 during a first interval INT1' between a time point t1' and a time point t2'. The time point t2' may denote a time when communication between the secure element 220 and the NFC integrated circuit 210 is requested or a time when a desired (or, alternatively, a predetermined) time period has elapsed since the request of the communication between the secure element 220 and the NFC integrated circuit 210. The power supply path control circuit 212 may cut off the first power supply path by turning off the first switch element SW1 at the time point t2'. After the time point t2', the first supply voltage E_SEVDD is not applied to the secure element 220. The time point t2' may be defined as a switching control time t_SWCNT at which turn-off of the first switch element SW1 is controlled. The power supply path control circuit 212 may detect that the first supply voltage E_SEVDD is applied to the NFC integrated circuit 210 through a terminal of the NFC integrated circuit 210 connected to the PMIC 250 and may enable the regulator 214 at the time point t2' based on the detection result such that the regulated second supply voltage I_SEVDD is applied to the secure element 220 during a second interval INT2' between the time point t2' and a time point t3'.

As described above, a power source supplying power to the secure element 220 is changed by the operation of the power supply path control circuit 212 in advance of an occurrence of an unexpected event, so that collision or bad influence between power supplied from the PMIC 250 and power supplied from the regulator 214 (or the battery 240) may be prevented.

Figure 4A:
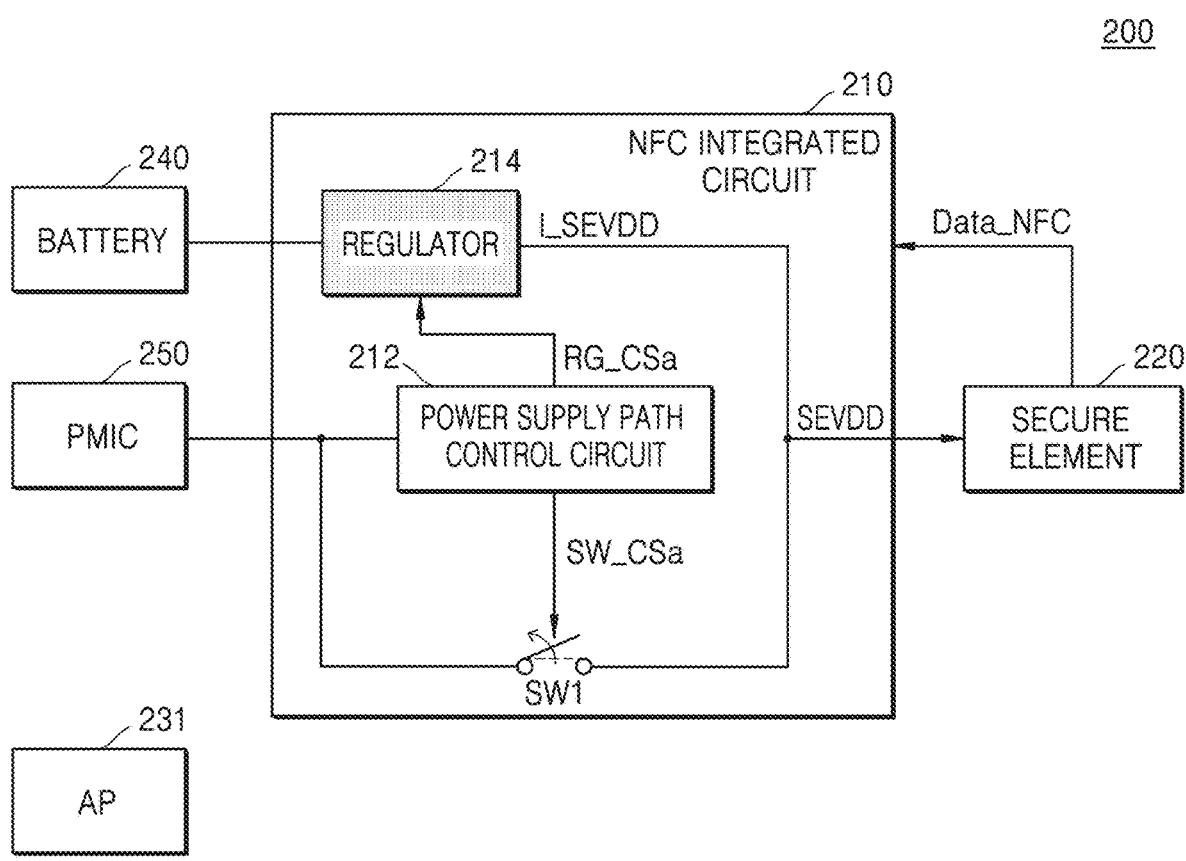
FIGS. 4A through 4C are diagrams for explaining the operation of a power supply path control circuit.
Figure 4B:
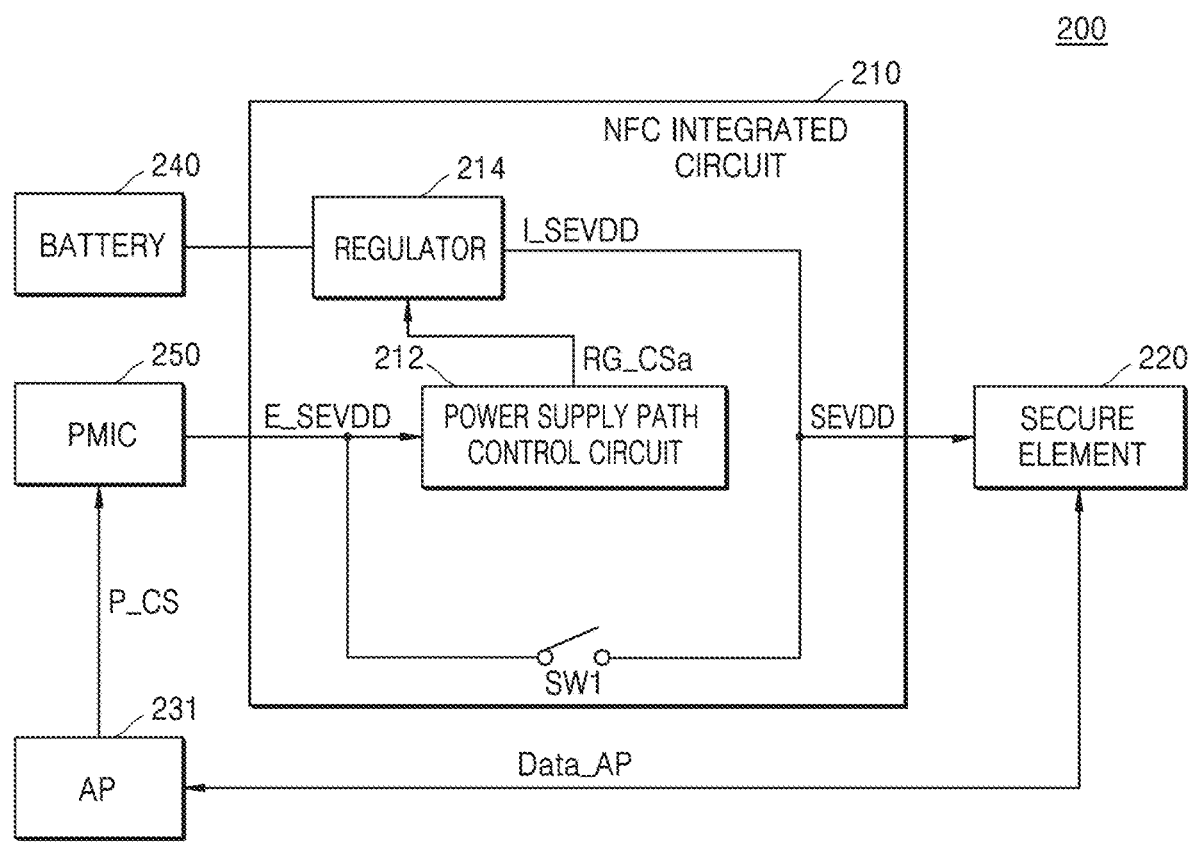
Figure 4C:
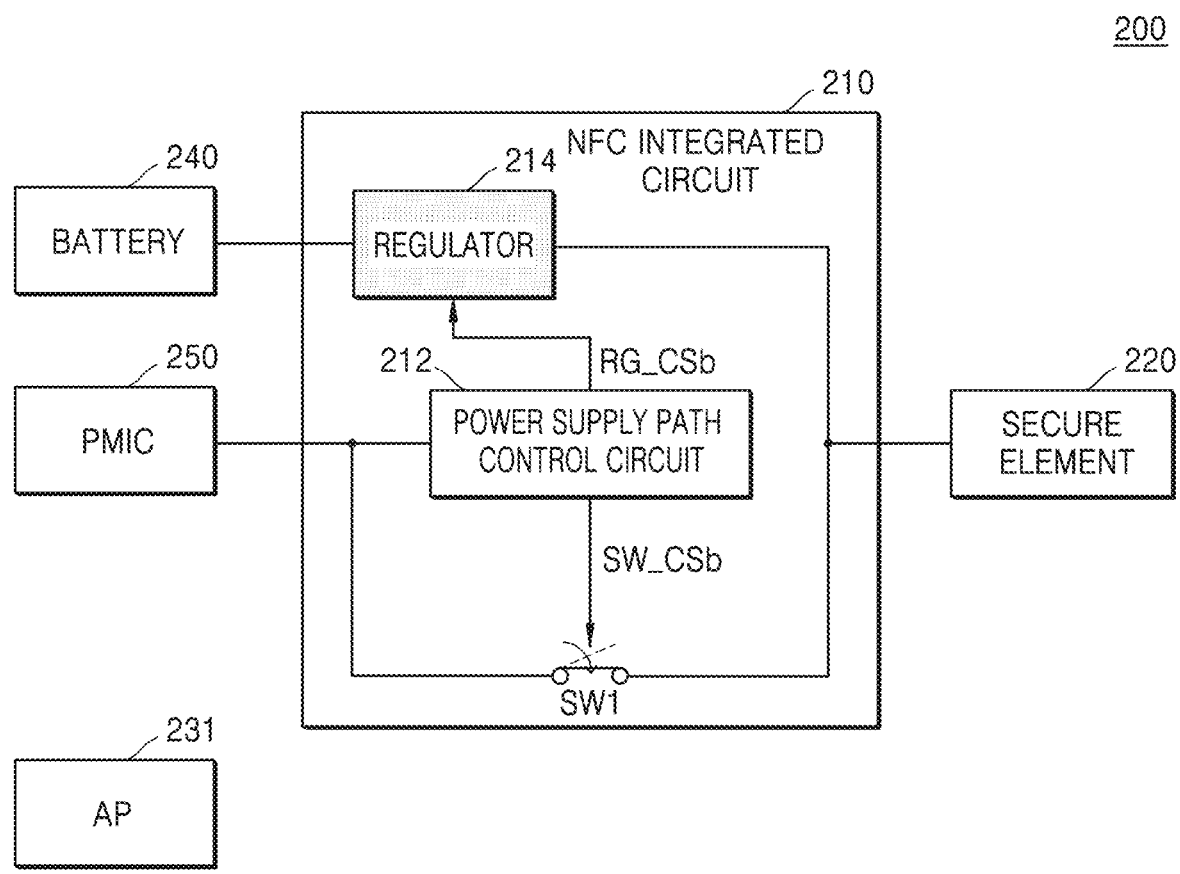

FIGS. 4A through 4C are diagrams for explaining the operation of the power supply path control circuit 212. The configuration of the wireless communication device 200 has been described with reference to FIGS. 2A through 2C above, and thus the detailed descriptions thereof will be omitted.

Referring to FIG. 4A, the NFC integrated circuit 210 is in the on-state (or the operating state) and may communicate with the secure element 220 to exchange the security data Data_NFC. To supply power for the communication to the secure element 220, the power supply path control circuit 212 may provide the enable control signal RG_CSa to the regulator 214. The power supply path control circuit 212 may also provide the turn-off control signal SW_CSa to the first switch element SW1 to cut off the first power supply path in advance. The AP 231 is not communicating with the secure element 220, and the PMIC 250 may not apply a first supply voltage to the NFC integrated circuit 210.

The regulator 214 may be enabled in response to the enable control signal RG_CSa and may regulate a second supply voltage received from the battery 240 to an operating voltage of the secure element 220. The power supply path control circuit 212 may form the second power supply path by enabling the regulator 214. The regulator 214 may provide the regulated second supply voltage I_SEVDD to the secure element 220 as the input voltage SEVDD.

Referring to FIG. 4B, the NFC integrated circuit 210 is in the on-state (or the operating state), and the communication between the NFC integrated circuit 210 and the secure element 220, which has been described with reference to FIG. 4A, may have been completed. The AP 231 may communicate with the secure element 220 to exchange the security data Data_AP and provide the power control signal P_CS to the PMIC 250 to provide power for the communication to the secure element 220.

The PMIC 250 may provide the first supply voltage E_SEVDD, which corresponds to the operating voltage of the secure element 220, to the NFC integrated circuit 210 in response to the power control signal P_CS. The power supply path control circuit 212 may detect existence or non-existence of the first supply voltage E_SEVDD provided from the PMIC 250 and form the second power supply path based on the detection result. The power supply path control circuit 212 may detect that the PMIC 250 currently applies the first supply voltage E_SEVDD to the NFC integrated circuit 210, using a voltage at a terminal of the NFC integrated circuit 210 connected to the PMIC 250. According to the detection, the power supply path control circuit 212 may form the second power supply path by providing the enable control signal RG_CSa to the regulator 214. However, when the regulator 214 has been enabled, as shown in FIG. 4A, the power supply path control circuit 212 may not separately provide the enable control signal RG_CSa to the regulator 214 but may control the second power supply path which has been formed to be maintained.

The NFC integrated circuit 210 may provide, as the input voltage SEVDD, the regulated second supply voltage I_SEVDD from the regulator 214 to the secure element 220 through the second power supply path. The secure element 220 may communicate with the AP 231 to exchange the security data Data_AP, using power supplied from the regulator 214.

Referring to FIG. 4C, when the NFC integrated circuit 210 does not perform the NFC operation or does not communicate with the secure element 220 for a desired (or, alternatively, a predetermined) time period, the NFC integrated circuit 210 may be changed from the on-state (or the operating state) into the off-state (or the idle state). Before the NFC integrated circuit 210 is changed into the off-state (or the idle state), the power supply path control circuit 212 may form the first power supply path by providing a turn-on control signal SW_CSb to the first switch element SW1. The power supply path control circuit 212 may also cut off the second power supply path by providing a disable control signal RG_CSb to the regulator 214.

Thereafter, the NFC integrated circuit 210 may bypass the first supply voltage from the PMIC 250 to the secure element 220 in the off-state (or the idle state).

Figure 5:
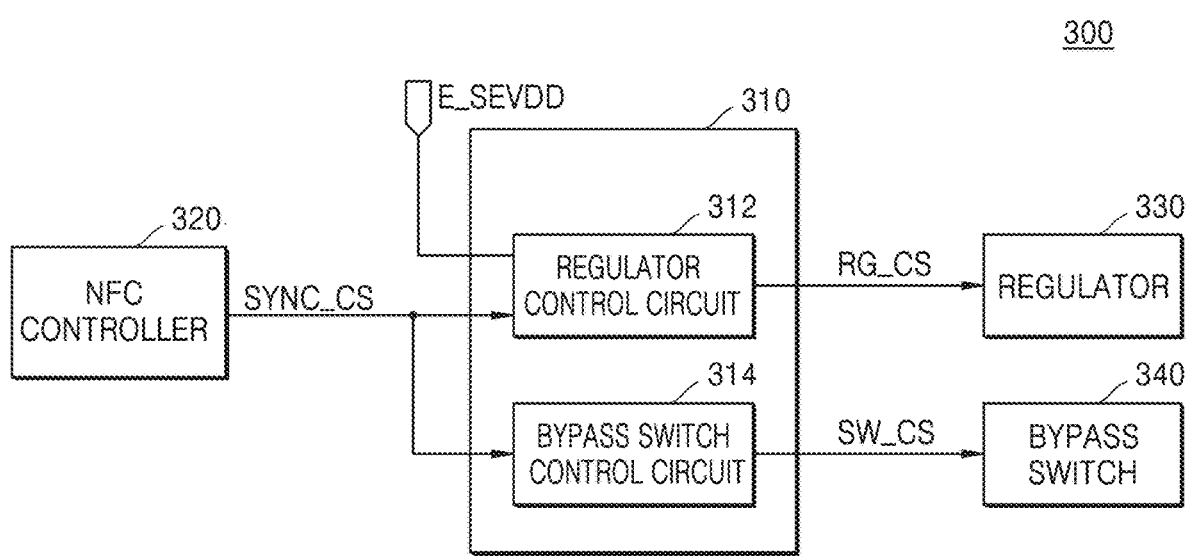
FIG. 5 is a block diagram of the configuration of a power supply path control circuit according to an example embodiment of the inventive concepts.

FIG. 5 is a block diagram of the configuration of a power supply path control circuit 310 according to an example embodiment of the inventive concepts.

Referring to FIG. 5, an NFC integrated circuit 300 may include the power supply path control circuit 310, an NFC controller 320, a regulator 330, and a bypass switch 340. The power supply path control circuit 310 may include a regulator control circuit 312 and a bypass switch control circuit 314.

In an example embodiment, the bypass switch 340 may be implemented by a transistor. Hereinafter, it is assumed that the bypass switch 340 is implemented by a P-channel metal-oxide semiconductor (PMOS) transistor. The regulator control circuit 312 may generate the enable/disable control signal RG_CS for controlling enable/disable of the regulator 330 and provide the enable/disable control signal RG_CS to the regulator 330 to control a second power supply path.

The bypass switch control circuit 314 may generate the switching control signal SW_CS for controlling on/off of the bypass switch 340 and provide the switching control signal SW_CS to the bypass switch 340 to control a first power supply path.

The NFC controller 320 may provide the power supply path control circuit 310 with a sync control signal SYNC_CS for controlling enable/disable of the power supply path control circuit 310. In an embodiment, the NFC controller 320 may provide the sync control signal SYNC_CS at a high level to use the function of the power supply path control circuit 310 when the NFC integrated circuit 300 is in an on-state (or an operating state). When the function of the power supply path control circuit 310 is not used during the on-state (or an operating state) of the NFC integrated circuit 300 or when the NFC integrated circuit 300 is in an off-state (or an idle state), the NFC controller 320 may provide the sync control signal SYNC_CS at a low level to the power supply path control circuit 310. In other words, when the NFC controller 320 enables the power supply path control circuit 310, the power supply path control circuit 310 may perform a power supply path control operation. When the NFC controller 320 disables the power supply path control circuit 310, the NFC controller 320 may directly perform the power supply path control operation.

However, the configuration of the power supply path control circuit 310 shown in FIG. 5 is just an example embodiment, and the inventive concepts are not limited thereto. The regulator control circuit 312 and the bypass switch control circuit 314 may not be implemented as separate circuits but may be integrated into a single circuit.

Figure 6:
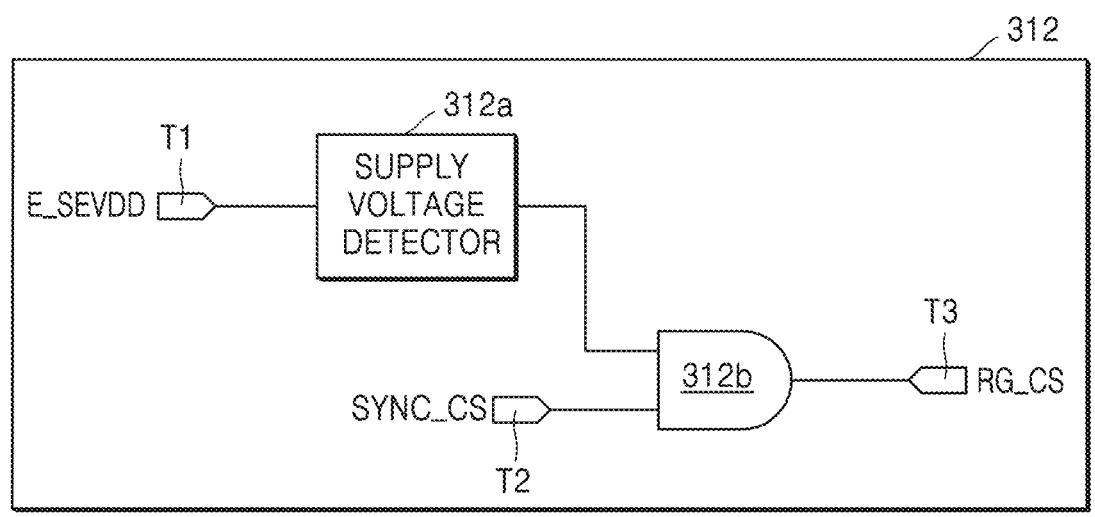
FIG. 6 is a diagram of the configuration of a regulator control circuit of FIG. 5, according to an example embodiment of the inventive concepts.

FIG. 6 is a diagram of the configuration of the regulator control circuit 312 of FIG. 5, according to an example embodiment of the inventive concepts.

Referring to FIG. 6, the regulator control circuit 312 may include first through third terminals T1, T2, and T3, a supply voltage detector 312a, and a first AND gate 312b. The supply voltage detector 312a may be connected to the first terminal T1 and may receive the first supply voltage E_SEVDD from an external PMIC. The supply voltage detector 312a may detect existence or non-existence of the first supply voltage E_SEVDD through a voltage of the first terminal T1 and output a detection result to the first AND gate 312b. For example, the supply voltage detector 312a may output the detection result at a high level when the first supply voltage E_SEVDD has been detected and may output the detection result at a low level when the first supply voltage E_SEVDD has not been detected.

The first AND gate 312b may be connected to an output terminal of the supply voltage detector 312a and the second and third terminals T2 and T3. The first AND gate 312b may receive the sync control signal SYNC_CS from an external NFC controller and receive the detection result from the supply voltage detector 312a. The first AND gate 312b may generate the enable/disable control signal RG_CS for a regulator based on the sync control signal SYNC_CS and the detection result and output the enable/disable control signal RG_CS to the regulator through the third terminal T3. For example, when the first AND gate 312b receives the sync control signal SYNC_CS at the low level, the first AND gate 312b always outputs the enable/disable control signal RG_CS at the low level, and therefore, the function of the regulator control circuit 312 is not used. At this time, the regulator control circuit 312 may be defined as being in a disabled state. When the first AND gate 312b receives the sync control signal SYNC_CS at the high level, the first AND gate 312b outputs the enable/disable control signal RG_CS at a different level according to the detection result, and therefore, the function of the regulator control circuit 312 is used. At this time, the regulator control circuit 312 may be defined as being in an enabled state.

Figure 7A:
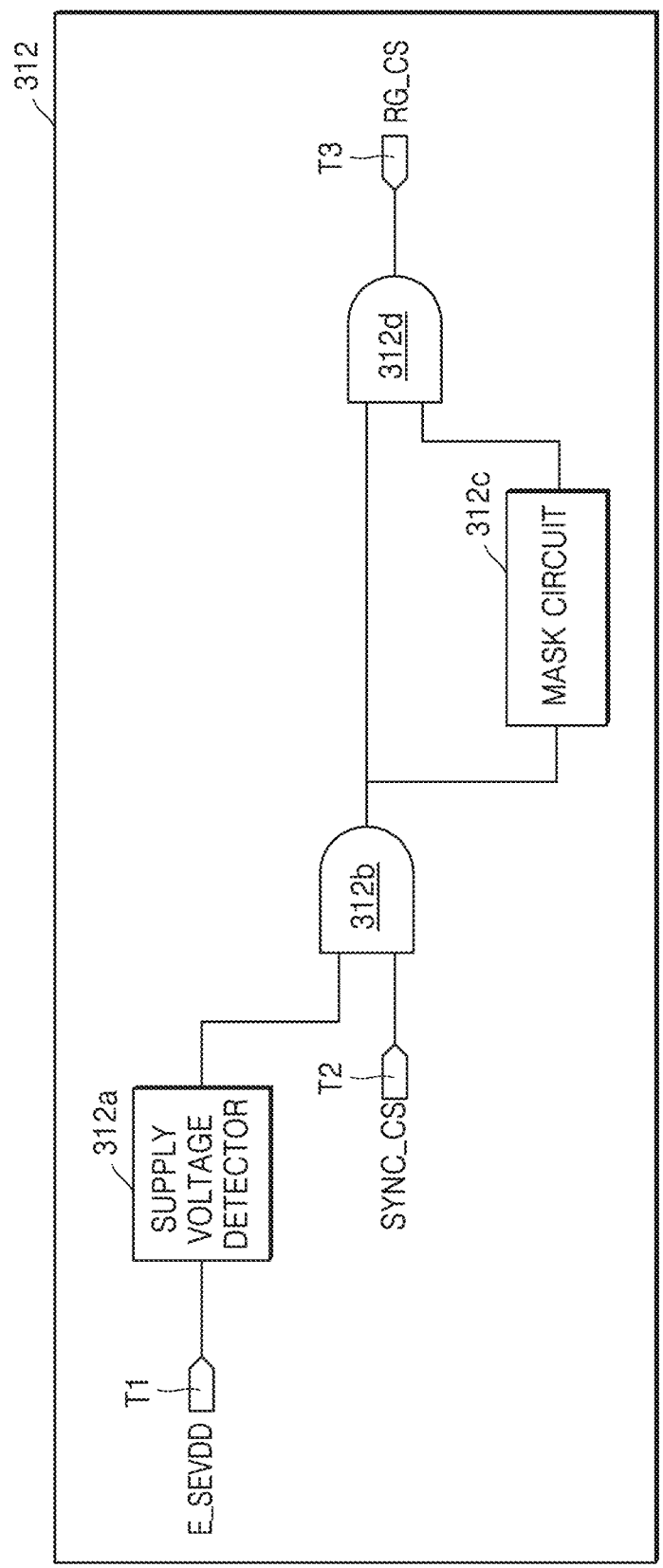
FIG. 7A is a diagram of the configuration of a regulator control circuit different from the one shown in FIG. 6.
Figure 7B:
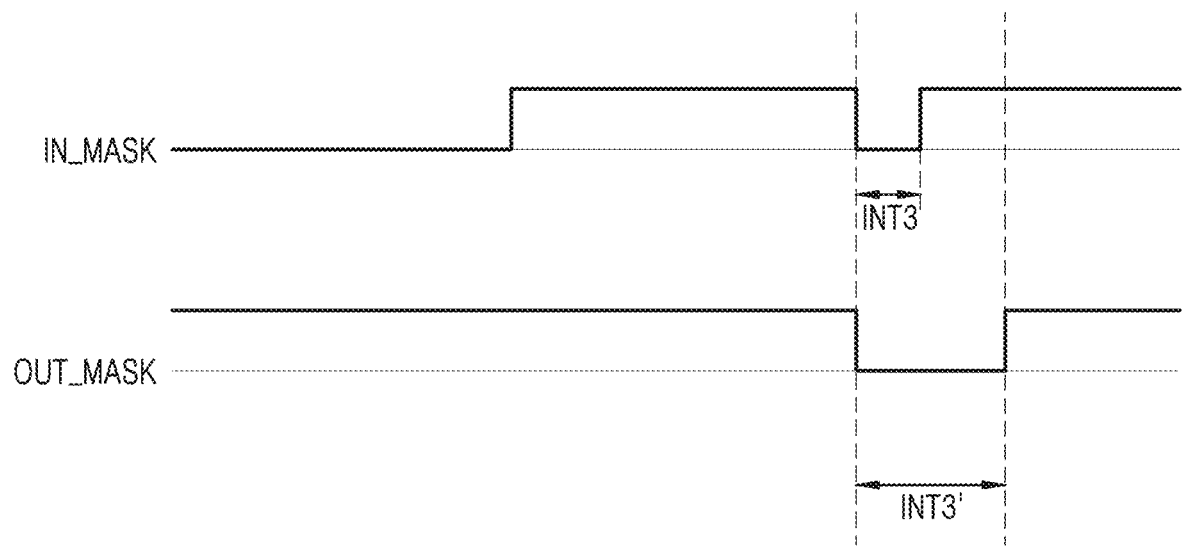
FIG. 7B is a diagram for explaining the operation of a mask circuit.

FIG. 7A is a diagram of the configuration of the regulator control circuit 312 different from the one shown in FIG. 6. FIG. 7B is a diagram for explaining the operation of a mask circuit 312c.

Referring to FIG. 7A, the regulator control circuit 312 may further include a mask circuit 312c and a second AND gate 312d compared to the regulator control circuit 312 of FIG. 6. The mask circuit 312c may be connected to an output terminal of the first AND gate 312b and an input terminal of the second AND gate 312d. The mask circuit 312c may operate to increase the width of a particular level interval of the enable/disable control signal RG_CS.

Referring to FIG. 7B, the mask circuit 312c may receive a mask input signal IN_MASK from the first AND gate 312b. In an embodiment, the mask circuit 312c may increase the width of a first low-level interval INT3 of the mask input signal IN_MASK to the width of a second low-level interval INT3'. The mask circuit 312c may increase the width of the first low-level interval INT3, in which the mask input signal IN_MASK is maintained at a low level starting from an edge where the mask input signal IN_MASK transits from a high level to the low level, to generate a mask output signal OUT_MASK including a second low-level interval INT3' in which the mask output signal OUT_MASK is maintained at the low level longer than the mask input signal IN_MASK.

The mask circuit 312c may control the width of the second low-level interval INT3' and may bypass the mask input signal IN_MASK when the function of the mask circuit 312c is not used.

In a case where a secure element may correctly perform a power reset operation under the condition that a supply voltage is not applied to the secure element for a reference time period, the mask circuit 312c may perform a power supply operation meeting the power reset condition for the secure element by converting the mask input signal IN_MASK into the mask output signal OUT_MASK. The mask circuit 312c may control the width of the second low-level interval INT3' to correspond to the power reset condition, i.e., the reference time period.

Referring back to FIG. 7A, the second AND gate 312d may be connected to the output terminal of the first AND gate 312b and an output terminal of the mask circuit 312c. The second AND gate 312d may output the enable/disable control signal RG_CS through the third terminal T3 based on an output signal of the first AND gate 312b and an output signal of the mask circuit 312c.

Figure 8:
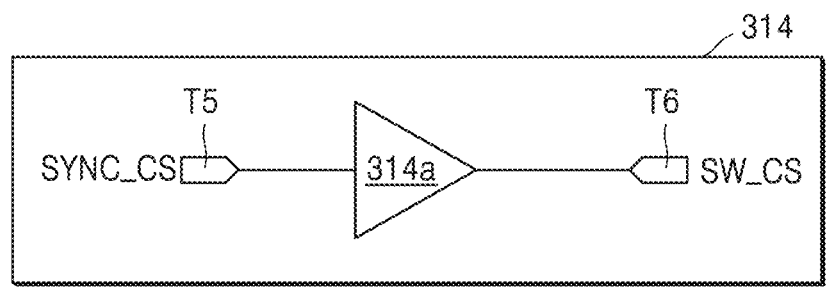
FIG. 8 is a diagram of the configuration of a bypass switch control circuit of FIG. 5, according to an example embodiment of the inventive concepts.

FIG. 8 is a diagram of the configuration of the bypass switch control circuit 314 of FIG. 5, according to an example embodiment of the inventive concepts.

Referring to FIG. 8, the bypass switch control circuit 314 may include a fifth terminal T5, a sixth terminal T6, and a signal buffer 314a. An input terminal of the signal buffer 314a may be connected to the fifth terminal T5 and an output terminal of the signal buffer 314a may be connected to the sixth terminal T6. The signal buffer 314a may receive the sync control signal SYNC_CS from an external NFC controller through the fifth terminal T5. The signal buffer 314a may buffer the sync control signal SYNC_CS and output the switching control signal SW_CS to a bypass switch through the sixth terminal T6. For example, when the signal buffer 314a receives the sync control signal SYNC_CS at the low level, the signal buffer 314a may output the switching control signal SW_CS at a low level, so that the bypass switch implemented by a PMOS transistor remains turned on, and therefore, the function of the bypass switch control circuit 314 is not used. At this time, the bypass switch control circuit 314 may be defined as being in a disabled state. When the signal buffer 314a receives the sync control signal SYNC_CS at the high level, the signal buffer 314a may output the switching control signal SW_CS at a high level, so that the bypass switch implemented by a PMOS transistor remains turned on, and therefore, the function of the bypass switch control circuit 314 is used. At this time, the bypass switch control circuit 314 may be defined as being in an enabled state.

Figure 9:
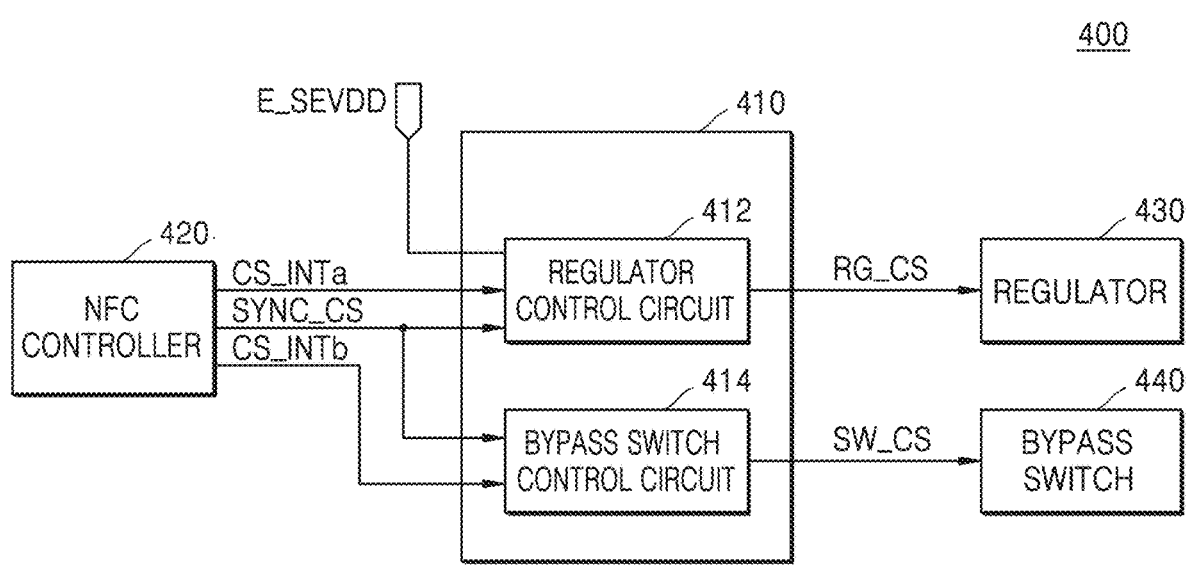
FIG. 9 is a block diagram of the configuration of a power supply path control circuit according to an example embodiment of the inventive concepts.

FIG. 9 is a block diagram of the configuration of a power supply path control circuit 410 according to an example embodiment of the inventive concepts. The configuration of an NFC integrated circuit 400 of FIG. 9 has been described in detail with reference to FIG. 5. Thus, descriptions will be focused on differences between the configuration of FIG. 9 and the configuration of FIG. 5.

Referring to FIG. 9, an NFC controller 420 may provide first and second internal control signals CS_INTa and CS_INTb to the power supply path control circuit 410 and directly control the operations of a regulator control circuit 412 and a bypass switch control circuit 414. For example, the NFC controller 420 may test whether power is properly supplied to a secure element through a first power supply path and a second power supply path. For this test, the NFC controller 420 may provide the first and second internal control signals CS_INTa and CS_INTb to the power supply path control circuit 410.

Figure 10:
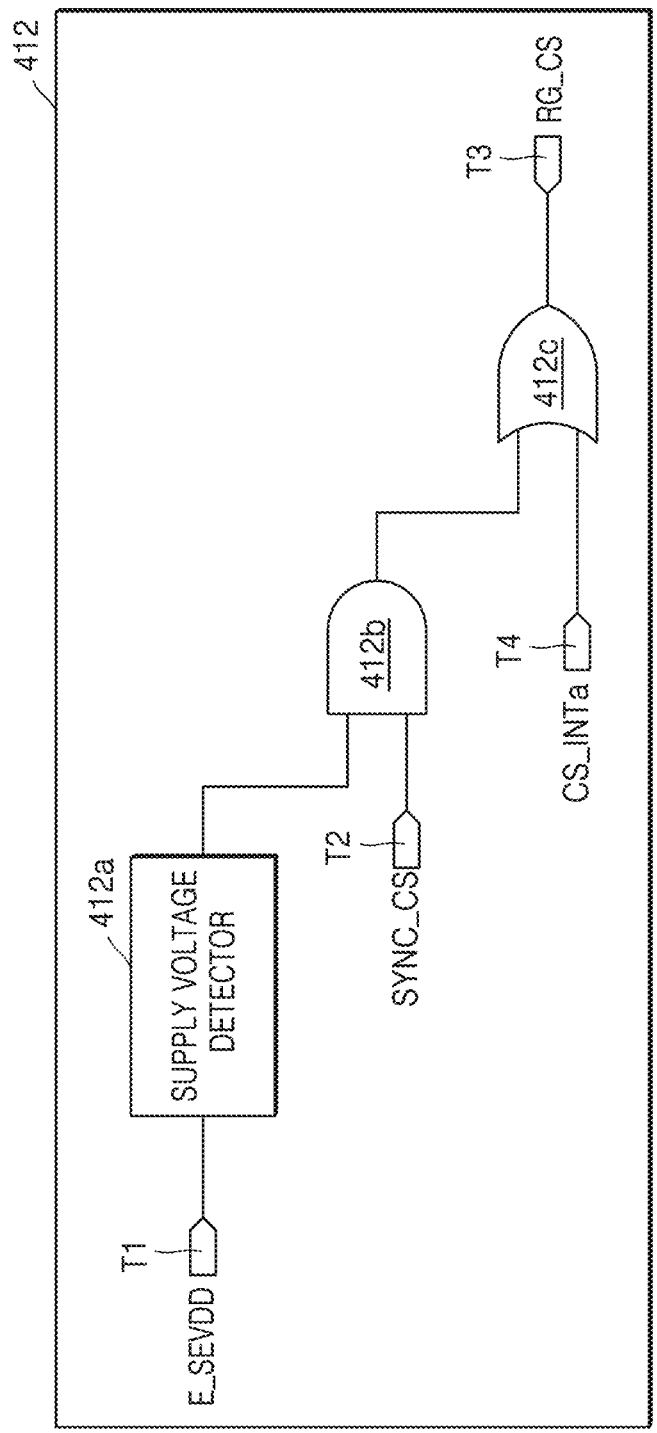
FIG. 10 is a diagram of the configuration of a regulator control circuit of FIG. 9, according to an example embodiment of the inventive concepts.

FIG. 10 is a diagram of the configuration of the regulator control circuit 412 of FIG. 9, according to an example embodiment of the inventive concepts. The configuration of the regulator control circuit 412 of FIG. 10 has been described in detail with reference to FIG. 6. Thus, descriptions will be focused on differences between the configuration of FIG. 10 and the configuration of FIG. 6.

Referring to FIG. 10, the regulator control circuit 412 may further include a fourth terminal T4 and an OR gate 412c compared to the regulator control circuit 312 of FIG. 6. The OR gate 412c may be connected to an output terminal of a first AND gate 412b and the third and fourth terminals T3 and T4. The OR gate 412c may receive the first internal control signal CS_INTa and an output signal of the first AND gate 412b. The OR gate 412c may output the enable/disable control signal RG_CS according to the first internal control signal CS_INTa regardless of the output signal of the first AND gate 412b.

Figure 11:
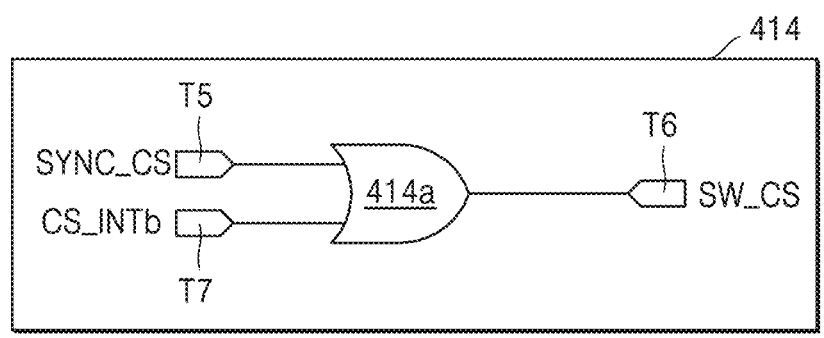
FIG. 11 is a diagram of the configuration of a bypass switch control circuit of FIG. 9, according to an example embodiment of the inventive concepts.

FIG. 11 is a diagram of the configuration of the bypass switch control circuit 414 of FIG. 9, according to an example embodiment of the inventive concepts. The configuration of the bypass switch control circuit 414 of FIG. 11 has been described in detail with reference to FIG. 8. Thus, descriptions will be focused on differences between the configuration of FIG. 11 and the configuration of FIG. 8.

Referring to FIG. 11, the bypass switch control circuit 414 may further include a seventh terminal T7 and an OR gate 414a compared to the bypass switch control circuit 314 of FIG. 8. Although not shown in FIG. 11, the bypass switch control circuit 414 may include a signal buffer. The OR gate 414a may be connected to the fifth through seventh terminals T5 through T7. The OR gate 414a may receive the sync control signal SYNC_CS through the fifth terminal T5 and the second internal control signal CS_INTb through the seventh terminal T7. The OR gate 414a may output the switching control signal SW_CS according to the second internal control signal CS_INTb regardless of the sync control signal SYNC_CS.

The configurations of a power supply path control circuit, which are respectively shown in FIGS. 6, 7A, 8, 10, and 11, are just example embodiments, and the inventive concepts are not limited thereto. It is apparent that the power supply path control circuit may be implemented in various configurations.

Figure 12A:
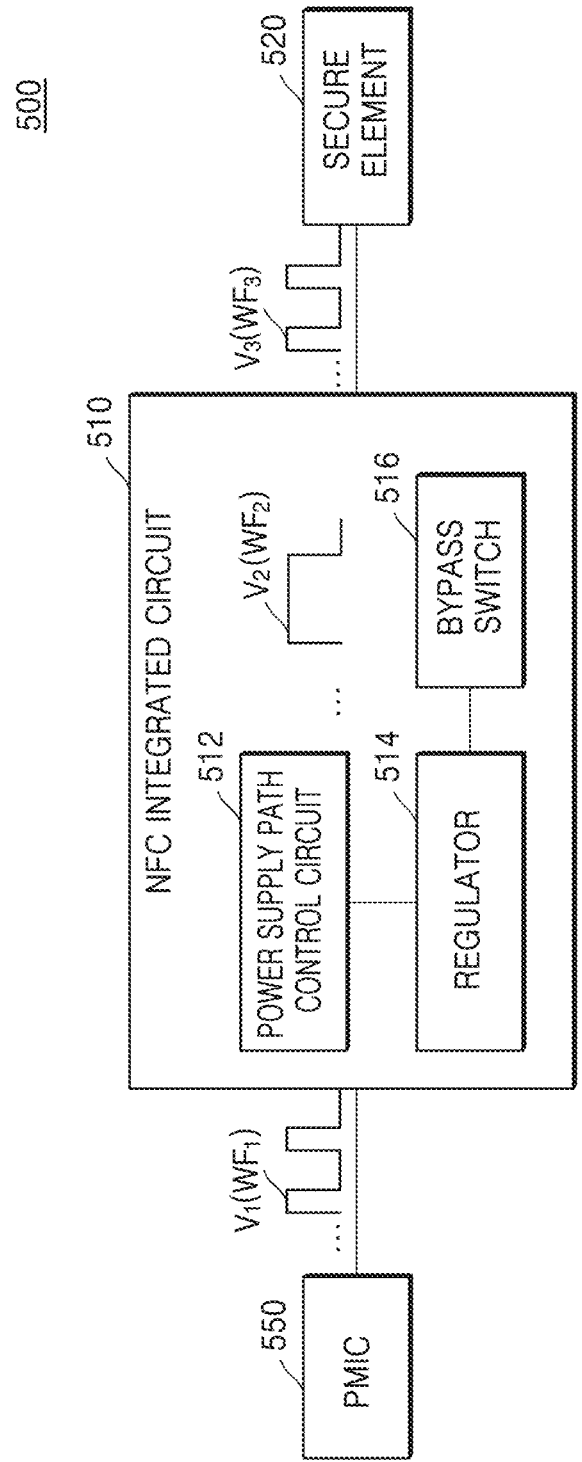
FIGS. 12A and 12B are diagrams for explaining the operation of a wireless communication device, according to an example embodiment of the inventive concepts.
Figure 12B:
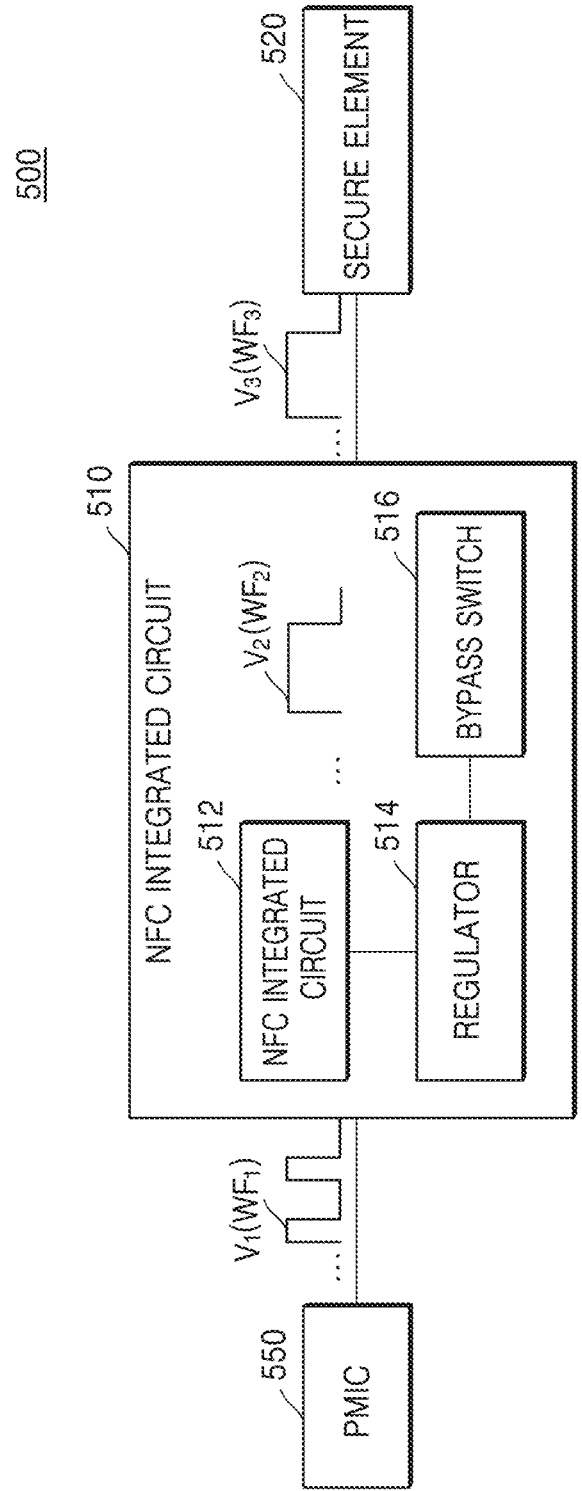

FIGS. 12A and 12B are diagrams for explaining the operation of a wireless communication device 500, according to an example embodiment of the inventive concepts.

Referring to FIG. 12A, the wireless communication device 500 may include an NFC integrated circuit 510, a secure element 520, and a PMIC 550. A power supply path control circuit 512 may transmit power from the PMIC 550 to the secure element 520 through a first power supply path or power from a regulator 514 to the secure element 520 through a second power supply path.

AS shown in FIG. 12A, in some example embodiments, when the NFC integrated circuit 510 is in an off state (or an idle state), the power supply path control circuit 512 may turn on a bypass switch 516 to bypass a first supply voltage $V_1$ having a first waveform $WF_1$, which is provided from the PMIC 550 through the first power supply path, to the secure element 520. Accordingly, a waveform $WF_3$ of an input voltage $V_3$ provided from the NFC integrated circuit 510 to the secure element 520 may be the same as or similar to the first waveform $WF_1$ of the first supply voltage $V_1$.

Referring to FIG. 12B, when the NFC integrated circuit 510 is in an on-state (or an operating state), the power supply path control circuit 512 may turn off the bypass switch 516 and enable or disable the regulator 514 based on the first supply voltage $V_1$ applied from the PMIC 550.

As shown in FIG. 12B, in some example embodiments, the power supply path control circuit 512 may provide a second supply voltage $V_2$ having a second waveform $WF_2$ from the regulator 514 to the secure element 520 through the second power supply path by enabling the regulator 514 when the first supply voltage $V_1$ is detected. Accordingly, the waveform $WF_3$ of the input voltage $V_3$ provided from the NFC integrated circuit 510 to the secure element 520 may be the same as or similar to the second waveform $WF_2$ of the second supply voltage $V_2$.

Figure 13:
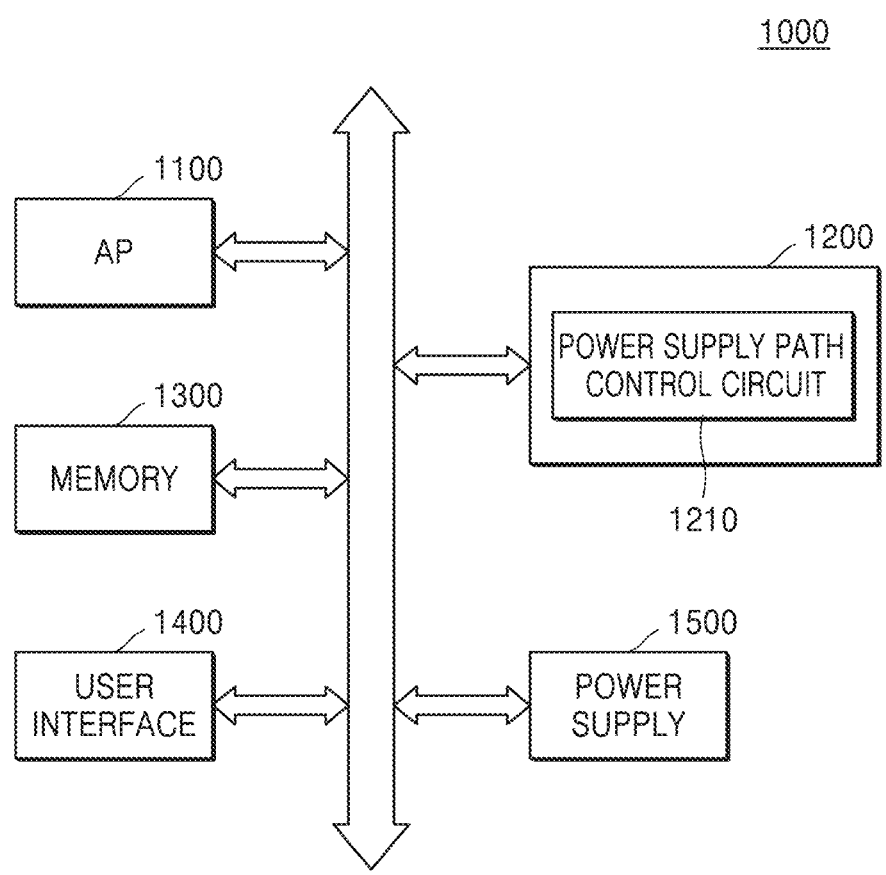
FIG. 13 is a block diagram of an electronic system according to an example embodiment of the inventive concepts.

FIG. 13 is a block diagram of an electronic system 1000 according to an example embodiment of the inventive concepts.

Referring to FIG. 13, the electronic system 1000 may include an AP 1100, an NFC device 1200, a memory device 1300, a user interface 1400, and a power supply 1500. The electronic system 1000 may be a mobile system such as a portable phone, a smartphone, a personal digital assistant (PDA), a portable multimedia player (PMP), a digital camera, a music player, a portable game console, a navigation system, or a laptop computer.

The AP 1100 may control all operations of the electronic system 1000. The AP 1100 may execute applications providing internet browsers, games, moving pictures, etc. The AP 1100 may include a single core or multiple cores.

The memory device 1300 may store data for the operations of the electronic system 1000. The memory device 1300 may store, for example, a boot image for booting the electronic system 1000, output data to be transmitted to an external device, and input data received from the external device.

The NFC device 1200 may transmit the output data stored in the memory device 1300 to the external device and receive the input data from the external device through NFC and may store the input data in the memory device 1300. The NFC device 1200 may include a power supply path control circuit 1210 according to an example embodiment of the inventive concepts. In other words, the power supply path control circuit 1210 may control a power supply path to an internal device (e.g., a secure element) of the NFC device 1200 based on the state of the NFC device 1200 or existence or non-existence of a supply voltage provided from the power supply 1500 such that stable power may be supplied to the internal device.

According to one or more example embodiments, the units and/or devices described above, such as the components of the wireless communication device including the NFC integrated circuit and the power supply path control circuit, the regulator and the NFC controller included therein as well as the sub-components of the power supply path control circuit including the regulator control circuit and bypass switch control circuit may be implemented using hardware, a combination of hardware and software, or a non-transitory storage medium storing software that is executable to perform the functions of the same. Further, other components of the wireless communication device including the secure element and the AP may also be implemented using hardware, a combination of hardware and software, or a non-transitory storage medium storing software that is executable to perform the functions of the same.

Hardware may be implemented using processing circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, etc., capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., one or more processors, CPUs, controllers, ALUs, DSPs, microcomputers, microprocessors, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor. In another example, the hardware device may be an integrated circuit customized into special purpose processing circuitry (e.g., an ASIC).

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Software and/or data may be embodied permanently or temporarily in any type of storage media including, but not limited to, any machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including tangible or non-transitory computer-readable storage media as discussed herein.

Storage media may also include one or more storage devices at units and/or devices according to one or more example embodiments. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store computer programs, program code, instructions, or some combination thereof, for one or more operating systems and/or for implementing the example embodiments described herein.

The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the storage media, the computer programs, program code, instructions, or some combination thereof, may be specially designed and constructed for the purposes of the example embodiments, or they may be known devices that are altered and/or modified for the purposes of example embodiments.

While example embodiments of the inventive concepts have been particularly shown and described with reference to some example embodiments thereof, it will be understood that various changes in form and details may be made therein without departing from the spirit and scope of the following claims.

What is claimed is:

1. A wireless communication device comprising:
an internal device configured to support a near field communication (NFC) operation; and
an NFC integrated circuit connected to a power management integrated circuit (PMIC) that is configured to supply a first supply voltage to the NFC integrated circuit and connected to a battery that is configured to supply a second supply voltage to the NFC integrated circuit, the battery being internal to the wireless communication device, the NFC integrated circuit configured to,
when a state of the NFC integrated circuit transitions from a first state to a second state, open a first power supply path from the PMIC to the internal device to inhibit supply of the first supply voltage to the internal device and form a second power supply path from the battery to the internal device, and when the state of the NFC integrated circuit transitions from the second state to the first state, control the first and second power supply paths to the internal device based on whether or not the first supply voltage from the PMIC is applied by closing the second power supply path while the first power supply path is open to supply the internal device with only the second supply voltage from the battery, in response to the PMIC applying the first supply voltage to the NFC integrated circuit.

2. The wireless communication device of claim 1, wherein the first state is any one of an on-state and an operating state, and the second state is any one of an off-state and an idle state.

3. The wireless communication device of claim 1, wherein the NFC integrated circuit is configured to, when the state of the NFC integrated circuit transitions from the second state to the first state, form the first power supply path and open the second power supply path in response to the first supply voltage not being applied.

4. The wireless communication device of claim 1, wherein the first power supply path is a path through which the first supply voltage from the PMIC is bypassed in the NFC integrated circuit and applied to the internal device, and the second power supply path is a path through which the second supply voltage from the battery is regulated in the NFC integrated circuit and applied to the internal device.

5. The wireless communication device of claim 1, wherein the internal device is a secure element configured to store security data.

6. The wireless communication device of claim 1, further comprising:

an application processor configured to control the PMIC to apply the first supply voltage to the NFC integrated circuit when internal data communication with the internal device is requested.

7. The wireless communication device of claim 6, wherein the internal device configured to use the second supply voltage received from the second power supply path when performing NFC communication with the NFC integrated circuit, and use a supply voltage received from a path formed among the first and second power supply paths when performing internal data communication with the application processor.

8. The wireless communication device of claim 1, wherein the NFC integrated circuit is further configured to control the first and second power supply paths so that intervals in which each of the first and second power supply paths are formed do not overlap.

9. The wireless communication device of claim 1, wherein the NFC integrated circuit further comprises:

a terminal connected to the PMIC, and wherein the NFC integrated circuit is further configured to detect a voltage of the terminal and determine whether the first supply voltage is applied based on a result of detecting the voltage of the terminal.

10. A wireless communication device comprising:

a battery;

a power management integrated circuit (PMIC) configured to generate a first supply voltage having a first waveform;

a near field communication (NFC) integrated circuit comprising a regulator connected to the battery and configured to generate a second supply voltage having a second waveform, the NFC integrated circuit being connected to the PMIC; and an internal device connected to the NFC integrated circuit and configured to support wireless communication, wherein the NFC integrated circuit is configured to, provide only the second supply voltage among the first supply voltage and the second supply voltage to the internal device when the NFC integrated circuit is in an on-state or an operating state such that the internal device is powered by the battery when the NFC integrated circuit is in the on-state or the operating state, and provide only the first supply voltage among the first supply voltage and the second supply voltage to the internal device, when the NFC integrated circuit is in an off-state or an idle state such that the internal device is powered by the PMIC when the NFC integrated circuit is in the off state or the idle state.

11. The wireless communication device of claim 10, wherein the NFC integrated circuit is configured to provide the second supply voltage to the internal device for a predetermined time in response to the first supply voltage being applied from the PMIC when a state of the NFC integrated circuit transitions from the on-state or the operating state to the off-state or the idle state, and then provide the first supply voltage to the internal device.

12. The wireless communication device of claim 10, further comprising:

an application processor, wherein the internal device is configured to use the second supply voltage when performing NFC communication with the NFC integrated circuit, and use the first supply voltage or the second supply voltage when performing internal data communication with the application processor.

13. A near field communication (NFC) integrated circuit configured to perform an NFC operation, the NFC integrated circuit comprising:

a first terminal configured to receive, from a power management integrated circuit (PMIC), a first supply voltage destined for an internal device connected to the NFC integrated circuit;

a second terminal configured to receive, from a battery, a second supply voltage used for the NFC operation; and a power supply path control circuit configured to, when a state of the NFC integrated circuit transitions from a first state to a second state, open a first power supply path from the PMIC to the internal device to inhibit supply of the first supply voltage to the internal device and form a second power supply path from the battery to the internal device, and when the state of the NFC integrated circuit transitions from the second state to the first state, control the first and second power supply paths to the internal device based on whether or not the first supply voltage is detected at the first terminal by closing the second power supply path while the first power supply path is open to supply the internal device with only the second supply voltage from the battery, in response the PMIC applying the first supply voltage to the first terminal of the NFC integrated circuit.

14. The NFC integrated circuit of claim 13, wherein
the first state is any one of an on-state and an operating state, and
the second state is any one of an off-state and an idle state.

15. The NFC integrated circuit of claim 13, wherein the power supply path control circuit is configured to, when the state of the NFC integrated circuit transitions from the second state to the first state, form the first power supply path and open the second power supply path in response to the first supply voltage not being detected at the first terminal.

16. The NFC integrated circuit of claim 13, wherein
the first power supply path is configured to bypass the first supply voltage to the internal device, and
the second power supply path is configured to regulate the second supply voltage and provide the regulated second supply voltage to the internal device.

17. The NFC integrated circuit of claim 16, wherein the power supply path control circuit is configured to control the first and second power supply paths so that intervals in which each of the first and second power supply paths are formed do not overlap.

18. The NFC integrated circuit of claim 17, wherein the internal device is configured to receive any one of the first and second supply voltages by the power supply path control circuit when performing data communication with an application processor.

* * * * *